US012214586B2

(12) United States Patent
Ukai et al.

(10) Patent No.: US 12,214,586 B2
(45) Date of Patent: Feb. 4, 2025

(54) PRINTER AND PRINTING CASSETTE

(71) Applicant: BROTHER KOGYO KABUSHIKI KAISHA, Nagoya (JP)

(72) Inventors: Shinji Ukai, Kiyosu (JP); Yuya Tagami, Nagoya (JP); Atsuo Hirose, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 123 days.

(21) Appl. No.: 17/705,275

(22) Filed: Mar. 26, 2022

(65) Prior Publication Data

US 2022/0212485 A1 Jul. 7, 2022

Related U.S. Application Data

(63) Continuation of application No. PCT/JP2020/034877, filed on Sep. 15, 2020.

(30) Foreign Application Priority Data

Sep. 30, 2019 (JP) ................................ 2019-178163

(51) Int. Cl.
*B41J 15/04* (2006.01)
*B41J 2/325* (2006.01)
*B41J 3/36* (2006.01)

(52) U.S. Cl.
CPC .............. *B41J 15/044* (2013.01); *B41J 2/325* (2013.01); *B41J 3/36* (2013.01)

(58) Field of Classification Search
CPC ... B41J 15/04; B41J 33/14; B41J 35/28; B41J 17/32; B41J 2/325; B41J 3/36; B41J 32/00
See application file for complete search history.

(56) References Cited

U.S. PATENT DOCUMENTS 3,672,603 A 6/1972 Swain
3,804,227 A 4/1974 Cappotto et al.
(Continued)

FOREIGN PATENT DOCUMENTS

CN 102092201 A 6/2011
CN 103273748 A 9/2013
(Continued)

OTHER PUBLICATIONS

International Search Report for PCT/JP2020/034877 dated Nov. 24, 2020.
(Continued)

*Primary Examiner* — John Zimmermann
(74) *Attorney, Agent, or Firm* — KENEALY VAIDYA LLP

(57) ABSTRACT

A printer includes a print head, a platen roller facing the print head, a driving source, a drive shaft connected to be driven to the driving source and rotatable about a rotation axis thereof, a platen gear connected to be driven to the platen roller, and a cassette mounting portion at which the print head and the drive shaft are disposed. A printing cassette including a to-be-printed tape, an input unit, and an output unit connected to be driven to the input unit is mountable on the cassette mounting portion in an axial direction of the rotation axis of the drive shaft. In a state where the printing cassette is mounted on the cassette mounting portion, the drive shaft is engaged with the input unit and the platen gear is engaged with the output unit.

7 Claims, 18 Drawing Sheets

(56) References Cited

U.S. PATENT DOCUMENTS

| | | | | |
|---|---|---|---|---|
| 3,823,808 | A | 7/1974 | Murata et al. | |
| 3,948,382 | A | 4/1976 | Nesbitt et al. | |
| 4,034,935 | A | 7/1977 | Plaza et al. | |
| 4,252,450 | A | 2/1981 | Goodman et al. | |
| 4,351,619 | A | 9/1982 | Duke et al. | |
| 4,397,574 | A | 8/1983 | Wojdyla | |
| 4,402,619 | A | 9/1983 | Paque et al. | |
| 4,490,059 | A | 12/1984 | Daughters | |
| 4,499,513 | A | 2/1985 | Umeda | |
| 4,538,931 | A | 9/1985 | Nagashima | |
| 4,565,128 | A | 1/1986 | Moriyama et al. | |
| 4,598,780 | A | 7/1986 | Iwasaki et al. | |
| 4,668,961 | A | 5/1987 | Hiramatsu | |
| 4,832,514 | A | 5/1989 | Basile | |
| 4,856,921 | A | 8/1989 | Hatakeyama | |
| 5,099,378 | A | 3/1992 | Turgeon | |
| 5,145,268 | A | 9/1992 | Cavallini | |
| 5,325,114 | A | 6/1994 | Fogle et al. | |
| 5,374,132 | A * | 12/1994 | Kimura | B41J 3/4075<br>400/594 |
| 5,402,954 | A | 4/1995 | Skavnak et al. | |
| 5,435,657 | A | 7/1995 | Pearce et al. | |
| 5,472,286 | A | 12/1995 | Uemura et al. | |
| 5,533,818 | A * | 7/1996 | Bahrabadi | B41J 11/009<br>400/208 |
| 5,619,244 | A | 4/1997 | Manna | |
| 5,645,360 | A | 7/1997 | Iwane et al. | |
| 5,917,532 | A | 6/1999 | Cornell et al. | |
| 5,959,652 | A | 9/1999 | Privin | |
| 6,190,067 | B1 * | 2/2001 | Kobayashi | B26D 5/16<br>400/208 |
| 6,511,238 | B1 | 1/2003 | Glize | |
| 10,189,284 | B2 * | 1/2019 | Yamaguchi | B41J 33/14 |
| 2001/0001627 | A1 | 5/2001 | Kobayashi et al. | |
| 2007/0172286 | A1 | 7/2007 | Pomfret | |
| 2008/0084494 | A1 | 4/2008 | Pomfret | |
| 2010/0166475 | A1 | 7/2010 | Yamaguchi et al. | |
| 2010/0166477 | A1 | 7/2010 | Yamaguchi et al. | |
| 2010/0166478 | A1 | 7/2010 | Yamaguchi et al. | |
| 2010/0166479 | A1 | 7/2010 | Yamaguchi et al. | |
| 2010/0166480 | A1 | 7/2010 | Yamaguchi et al. | |
| 2010/0247205 | A1 | 9/2010 | Yamaguchi et al. | |
| 2010/0247206 | A1 | 9/2010 | Yamaguchi et al. | |
| 2010/0247208 | A1 | 9/2010 | Yamaguchi et al. | |
| 2010/0247212 | A1 | 9/2010 | Yamaguchi et al. | |
| 2010/0254742 | A1 | 10/2010 | Yamaguchi et al. | |
| 2012/0026269 | A1 | 2/2012 | Suva | |
| 2012/0080550 | A1 | 4/2012 | Yamaguchi et al. | |
| 2015/0283836 | A1 | 10/2015 | Sakano et al. | |
| 2015/0283837 | A1 | 10/2015 | Sakano | |
| 2015/0283838 | A1 | 10/2015 | Sakano | |
| 2016/0236495 | A1 | 8/2016 | Sakano | |
| 2016/0243867 | A1 | 8/2016 | Sakano | |
| 2016/0361930 | A1 | 12/2016 | Sodeyama et al. | |
| 2016/0368275 | A1 | 12/2016 | Sakano et al. | |
| 2016/0368294 | A1 | 12/2016 | Sakano et al. | |
| 2017/0036464 | A1 | 2/2017 | Sakano | |
| 2017/0072704 | A1 | 3/2017 | Sakano et al. | |
| 2017/0106680 | A1 | 4/2017 | Sakano | |
| 2017/0210151 | A1 | 7/2017 | Sakano et al. | |
| 2018/0015759 | A1 * | 1/2018 | Tonishi | B41J 32/00 |
| 2018/0037043 | A1 | 2/2018 | Sakano et al. | |
| 2018/0043715 | A1 | 2/2018 | Sakano | |
| 2018/0099514 | A1 | 4/2018 | Sakano | |
| 2019/0030935 | A1 | 1/2019 | Sakano et al. | |
| 2019/0061375 | A1 * | 2/2019 | Matsumoto | C09J 121/00 |
| 2020/0147988 | A1 | 5/2020 | Sakano et al. | |

FOREIGN PATENT DOCUMENTS

| | | | |
|---|---|---|---|
| CN | 106103112 | A | 11/2016 |
| CN | 106103113 | A | 11/2016 |
| CN | 106103116 | A | 11/2016 |
| CN | 106132712 | A | 11/2016 |
| CN | 106132719 | A | 11/2016 |
| EP | 0414544 | A2 | 2/1991 |
| GB | 2016411 | A | 9/1979 |
| JP | S50-36734 | B1 | 11/1975 |
| JP | S54-111914 | A | 9/1979 |
| JP | S58-141479 | A | 8/1983 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | A | 5/1987 |
| JP | S62-103179 | U | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y2 | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-53956 | A | 7/1993 |
| JP | H05-53956 | U | 7/1993 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183205 | A | 7/1996 |
| JP | H08-183232 | A | 7/1996 |
| JP | 2000-6504 | A | 1/2000 |
| JP | 2000-103149 | A | 4/2000 |
| JP | 2001-47713 | A | 2/2001 |
| JP | 2002-211092 | A | 7/2002 |
| JP | 2006-110811 | A | 4/2006 |
| JP | 2007-502221 | A | 2/2007 |
| JP | 2008-261968 | A | 10/2008 |
| JP | 2009-196804 | A | 9/2009 |
| JP | 2010-234772 | A | 10/2010 |
| JP | 2011-46142 | A | 3/2011 |
| JP | 2011-148167 | A | 8/2011 |
| JP | 2011-150007 | A | 8/2011 |
| JP | 2012-158175 | A | 8/2012 |
| JP | 2012-236307 | A | 12/2012 |
| JP | 2014-170142 | A | 9/2014 |
| JP | 2015-182318 | A | 10/2015 |
| WO | 2005/018944 | A1 | 3/2005 |

OTHER PUBLICATIONS

Office Action for the corresponding Chinese patent application No. 202080067936.X dated Feb. 8, 2024.

International Preliminary Report on Patentability and English language Written Opinion of the International Search Report for PCT/JP2020/034877 dated Apr. 5, 2022.

Partial Supplementary European Search Report for the related European Patent Application No. 20871133.3 dated Aug. 10, 2023.

Extended European Search Report for the related European Patent Application No. 20871133.3 dated Aug. 14, 2024.

Japanese Office Action for the related Japanese Patent Application No. 2023-121497 Dated Aug. 27, 2024.

* cited by examiner

PRINTER AND PRINTING CASSETTE

CROSS-REFERENCE TO RELATED APPLICATION

This is a continuation application of International Application No. PCT/JP2020/034877 filed on Sep. 15, 2020 which claims priority from Japanese Patent Application No. 2019-178163 filed on Sep. 30, 2019. The entire contents of the earlier applications are incorporated herein by reference.

TECHNICAL FIELD

Aspects of the disclosure relate to a printer and a printing cassette.

BACKGROUND

In a printer that performs printing on a printing tape, replacement and resupply of a printing tape is performed by attachment and detachment of a cassette accommodating a printing tape to and from the printer (see Patent Literature 1).

SUMMARY

In the above-described printer, a platen roller may convey the printing tape in the cassette toward the outside of the cassette. The platen roller may be rotationally driven by a driving source such as a motor.

However, if the platen roller rotates when the cassette is not installed in the printer, an unexpected problem may occur. For example, if the platen roller rotates during installation of the cassette, the printing tape may be jammed.

Accordingly, aspects of the disclosure provide a printer and a printing cassette in which an unexpected rotation of a platen roller may be reduced.

In one or more aspects of the disclosure, a printer may include: a print head; a platen roller facing the print head; a driving source; a drive shaft connected to be driven to the driving source and is rotatable about a rotation axis thereof; a platen gear connected to be driven to the platen roller; and a cassette mounting portion at which the print head and the drive shaft are disposed.

A printing cassette including a to-be-printed tape, an input unit, and an output unit connected to be driven to the input unit may be mountable on the cassette mounting portion in an axial direction of the rotation axis of the drive shaft. In a state where the printing cassette is mounted on the cassette mounting portion, the drive shaft may be engaged with the input unit and the platen gear is engaged with the output unit.

In one or more aspects of the disclosure, a printing cassette mountable on a printer may include a print head, a platen roller facing the print head, a driving source, a drive shaft connected to be driven to the driving source and rotatable about a rotation axis thereof, a platen gear connected to be driven to the platen roller, and a cassette mounting portion at which the print head and the driving shaft are disposed, in an axial direction of the rotation axis of the drive shaft.

The printing cassette may include a to-be-printed tape, an input unit, and an output unit. In a state where the printing cassette is mounted on the cassette mounting portion, the input unit may be engaged with the drive shaft and the output unit is engaged with the platen gear.

According to these configurations, a driving force from the driving source of the printer may be transmitted to the platen roller via the input unit and the output unit in the printing cassette. That is, the driving force may be transmitted to the platen roller only when the printing cassette is mounted on the printer. Therefore, an unexpected rotation of the platen roller may be reduced in a state where the printing cassette is not mounted.

In one or more aspects of the disclosure, a printing cassette may include: a case; a to-be-printed tape, at least a portion of which is accommodated in the case; a first gear including a first internal gear and a first external gear; a transmission gear or a transmission gear train engaging with the first external gear; and a second gear including a second external gear engaging with the transmission gear or the transmission gear train. An entirety of the first internal gear may be accommodated in the case. A portion of the second external gear may be located outside the case.

According to these configurations, a driving force from the driving source of the printer may be transmitted to the platen roller via the first gear, the transmission gear or the transmission gear train, and the second gear in the printing cassette. That is, the driving force may be transmitted to the platen roller only when the printing cassette is mounted on the printer. Therefore, an unexpected rotation of the platen roller may be reduced in a state where the printing cassette is not mounted.

DETAILED DESCRIPTION

First Illustrative Embodiment

1-1. Configuration

Figure 1A:
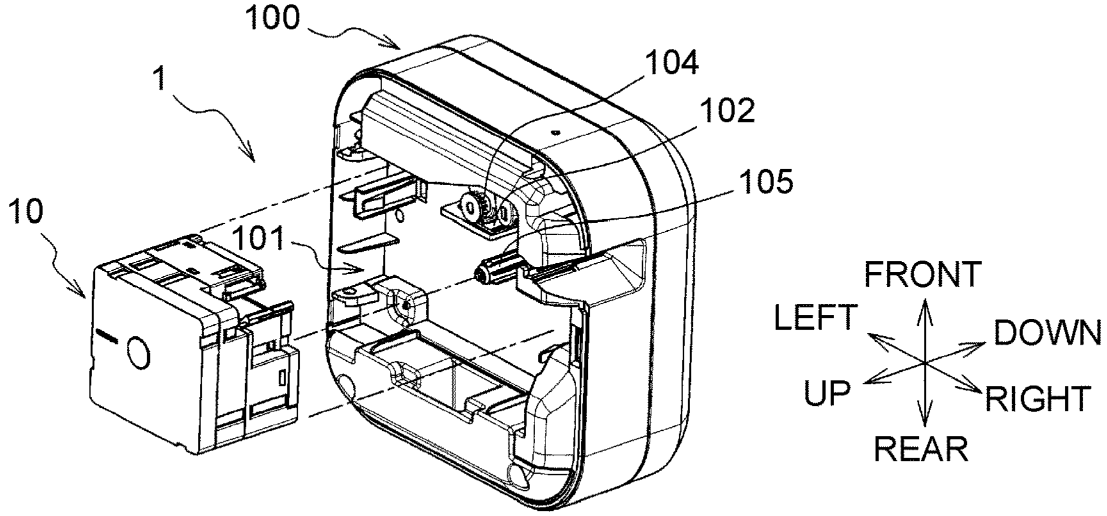
FIGS. 1A, 1B, and 1C are schematic perspective views each illustrating a state in which a printing cassette is detached from a printer in a printing system er according to an illustrative embodiment.
Figure 1B:
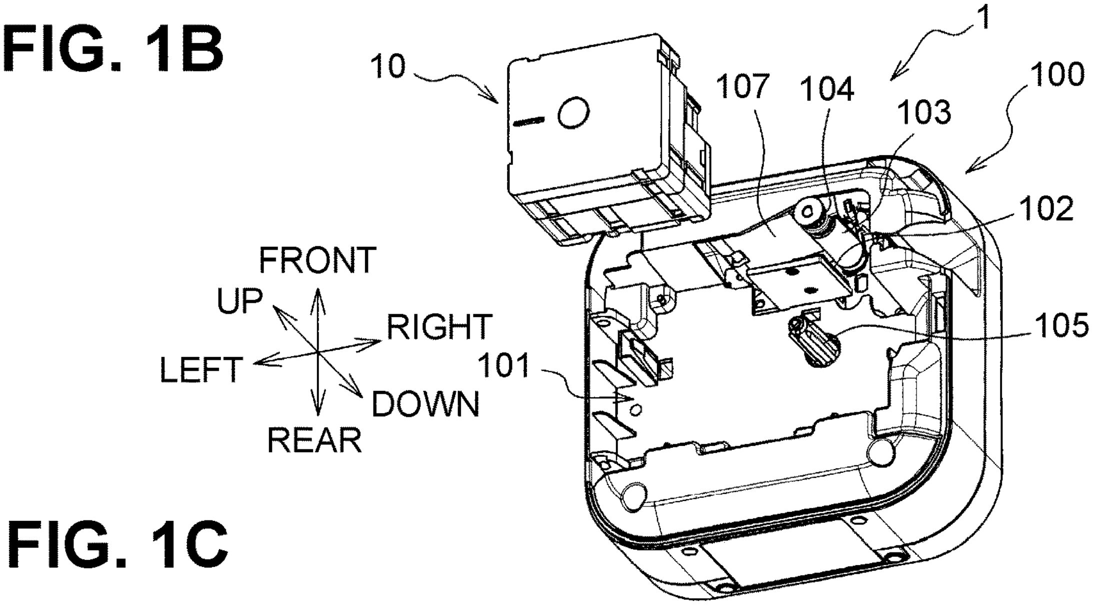
Figure 1C:
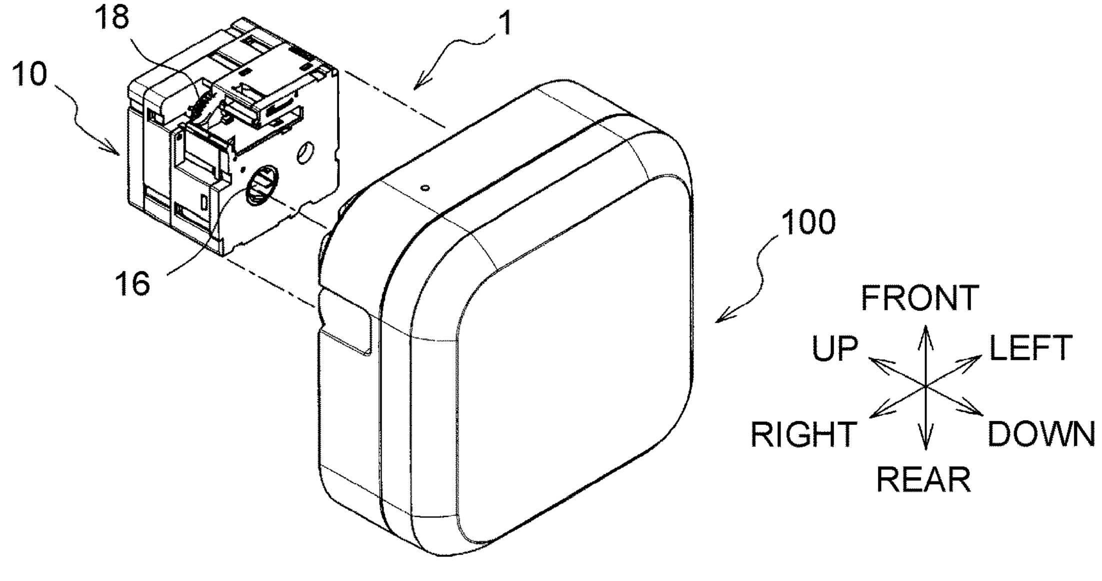

A printing system 1 illustrated in FIGS. 1A, 1B, and 1C includes a printing cassette 10 and a printer 100. The printing system 1 may be a device that performs printing on a tape-shaped printing medium.

In the illustrative embodiment, an axial direction of an output gear 18 is defined as an up-down direction. A direction that is perpendicular to the up-down direction and in which the output gear 18 and an input spool 16 are arranged next to each other is defined as a front-rear direction. A direction perpendicular to both the up-down direction and the front-rear direction is defined as a left-right direction.

<Printing Cassette>

The printing cassette 10 accommodates a printing medium. The printing cassette 10 is mountable on and removable from the printer 100. Replacing the printing cassette 10 may achieve resupply of a printing medium and change of a type (e.g., color, material, or others) of the printing medium.

Figures 2A, 2B, 2C:
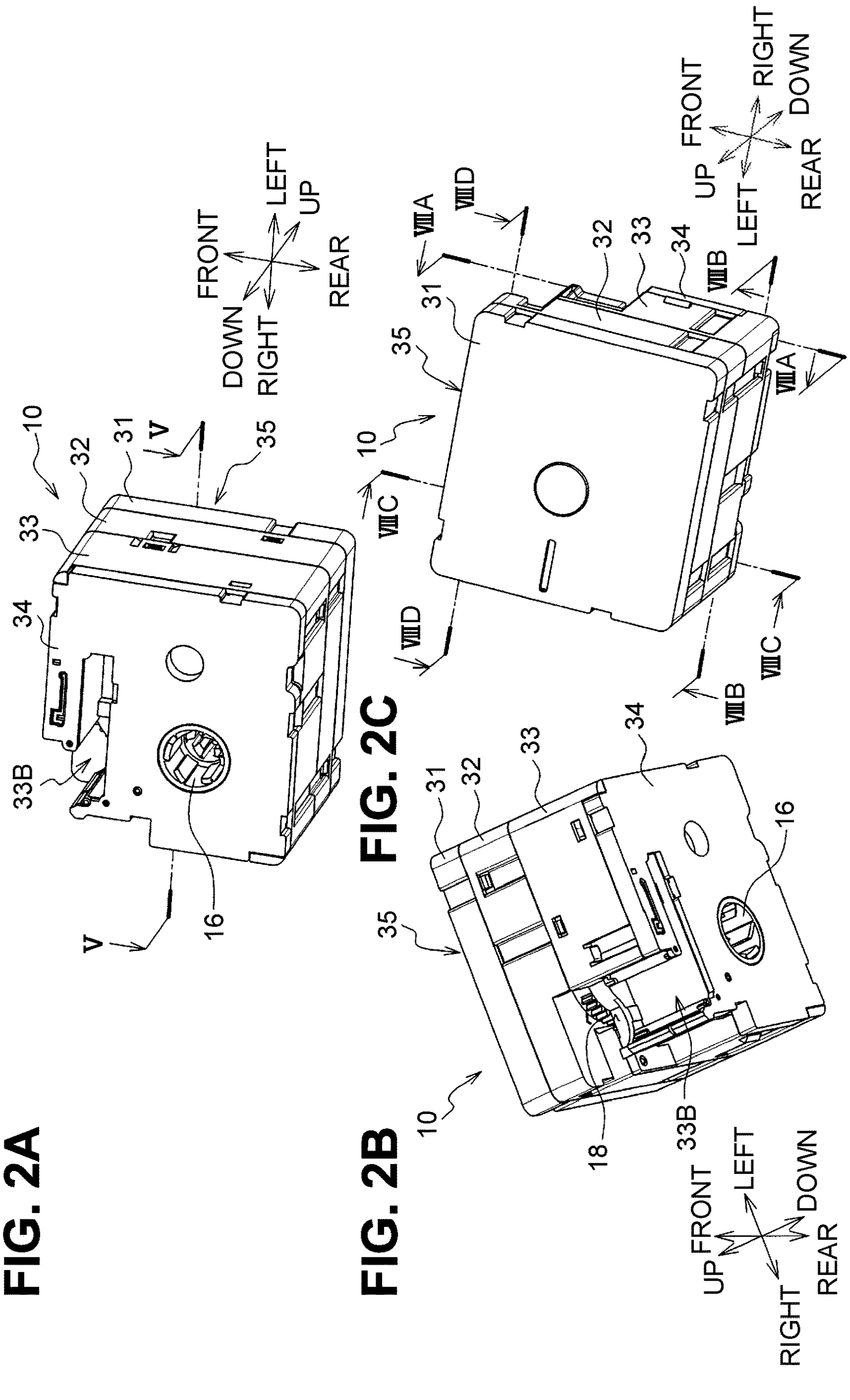
FIGS. 2A, 2B, and 2C are schematic perspective views each illustrating the printing cassette in the printing system of FIG. 1A.

As illustrated in FIGS. 2A, 2B, and 2C, the printing cassette 10 includes a case 35 that accommodates a to-be-printed tape, an ink ribbon, and others. An outer shape of the printing cassette 10 (i.e., a shape of the case 35) is a rectangular parallelepiped having sides parallel to the up-down direction, sides parallel to the front-rear direction, and sides parallel to the left-right direction.

The case 35 is configured to be mounted facing downward with respect to the printer 100. The case 35 includes a first cover portion 31, a first case portion 32, a second case portion 33, and a second cover portion 34.

Figure 3:
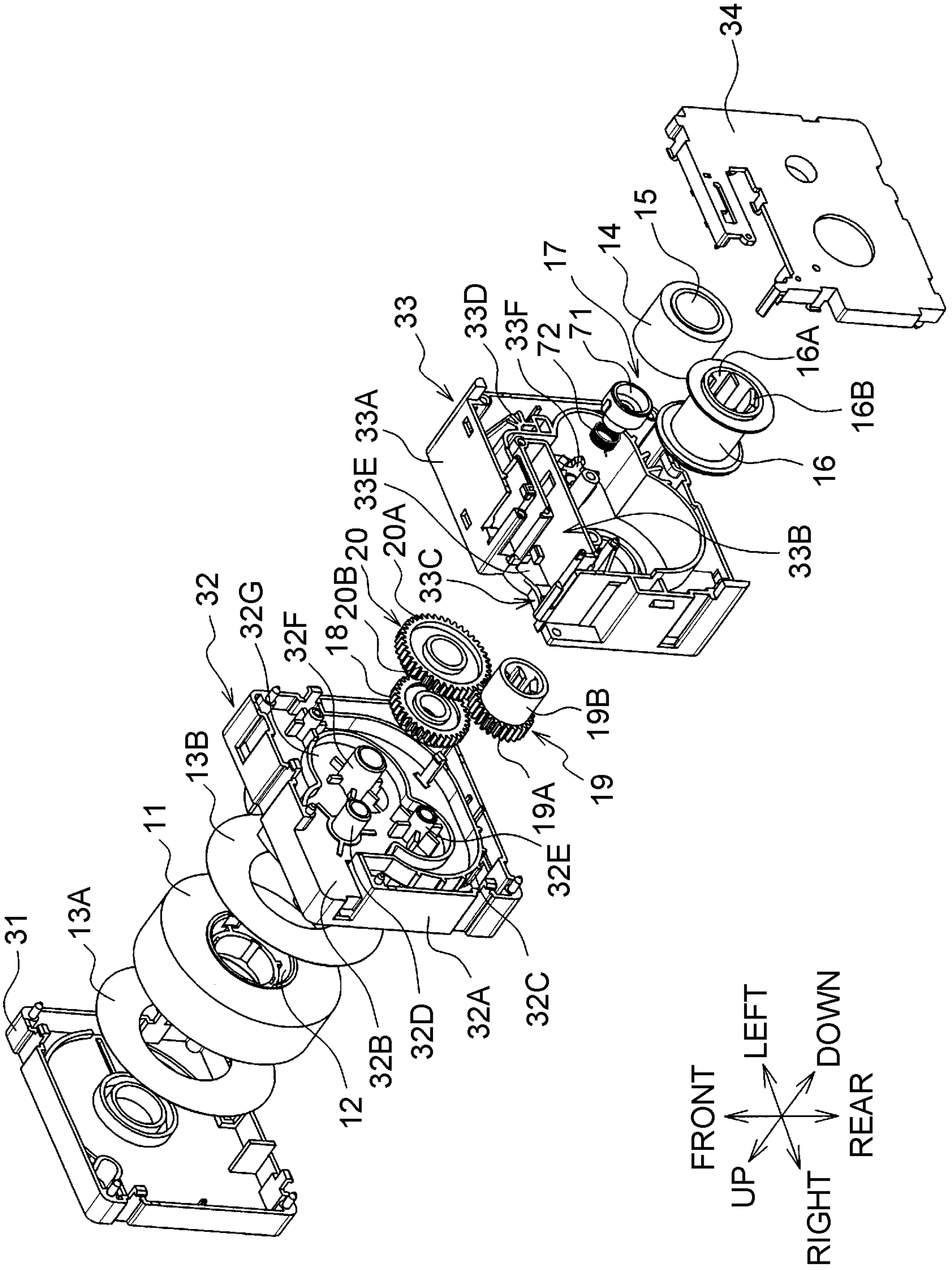
FIG. 3 is a disassembled schematic perspective view of the printing cassette of FIG. 2A.

As illustrated in FIG. 3, the printing cassette 10 includes a to-be-printed tape roll 11, a first feed spool 12, a spacer film 13A, a spacer film 13B, an ink ribbon roll 14, a second feed spool 15, an input spool 16 (an example of a rotating spool), a clutch 17, the output gear 18, the input gear 19, and an idle gear 20.

(To-be-Printed Tape Roll)

In the to-be-printed tape roll 11, a to-be-printed tape on which printing is to be performed is wound around the first feed spool 12. Printing is performed on a surface of the to-be-printed tape by a print head 102 of the printer 100 and an ink ribbon.

Two spacer films 13A, 13B are disposed outside the to-be-printed tape roll 11 in the up-down direction such that the spacer films 13A. 13B sandwich the to-be-printed tape roll 11 therebetween. The spacer film 13A is disposed between the to-be-printed tape roll 11 and the first cover portion 31. The spacer film 13B is disposed between the to-be-printed tape roll 11 and the first case portion 32.

(First Feed Spool)

The first feed spool 12 is rotatable about its rotation axis. The first feed spool 12 rotates along with conveyance of the to-be-printed tape by a platen roller 103 of the printer 100, thereby feeding the to-be-printed tape to the print head 102.

(Ink Ribbon Roll)

In the ink ribbon roll 14, the ink ribbon used for printing on the to-be-printed tape is wound around the second feed spool 15.

In a head opening 33B, the ink ribbon is laid on the to-be-printed tape and used for printing performed by the print head 102 therein. The ink ribbon that has been used for printing is taken up by the input spool 16.

(Second Feed Spool)

The second feed spool 15 is rotatable about its rotation axis. The rotation axis of the second feed spool 15 is parallel to the rotational axis of the first feed spool 12, that is, parallel to the up-down direction. The second feed spool 15 rotates in a first rotation direction to feed the ink ribbon from the ink ribbon roll 14.

The second feed spool 15 rotates along with take-up of the ink ribbon by the input spool 16, thereby feeding the ink ribbon to the print head 102. Further, the second feed spool 15 is disposed such that a portion thereof overlaps the to-be-printed tape roll 11 in the up-down direction.

(Input Spool)

The input spool 16 is rotatable about its rotation axis. The rotation axis of the input spool 16 is parallel to the rotation axis of the second feed spool 15.

The input spool 16 has a cylindrical shape and has a hollow portion defined by an inner peripheral surface 16A. Spline teeth 16B are provided on the inner peripheral surface 16A of the input spool 16. That is, the input spool 16 may be an internal gear. A drive shaft 105 of the printer 100 is to be coupled to the spline teeth 16B. The input spool 16 is rotated by the drive shaft 105 to take up the ink ribbon.

(Clutch)

Figure 4:
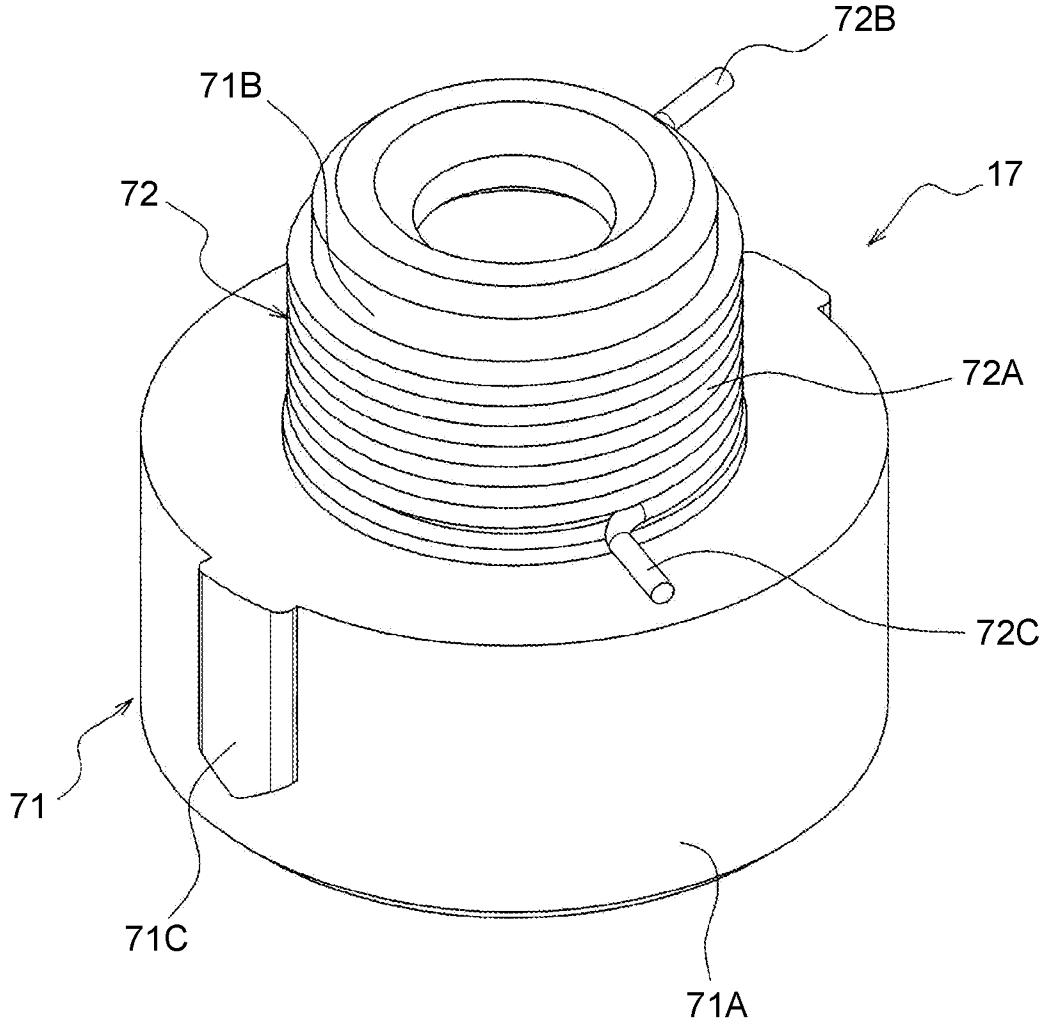
FIG. 4 is a schematic perspective view of a clutch in the printing cassette of FIG. 3A.

As illustrated in FIG. 4, the clutch 17 includes a spring holder 71 and a clutch spring 72. The spring holder 71 is rotatable about its rotation axis.

The spring holder 71 includes a first cylindrical portion 71A, a second cylindrical portion 71B, and a projection 71C. The second cylindrical portion 71B has an outside diameter smaller than the first cylindrical portion 71A. A central axis of the second cylindrical portion 71B is coaxial with a center axis of the first cylindrical portion 71A. The projection 71C protrudes outward in a radial direction of the first cylindrical portion 71A from an outer peripheral surface of the first cylindrical portion 71A.

The clutch spring 72 includes a coil portion 72A, a first engagement portion 72B, and a second engagement portion 72C. The coil portion 72A includes a wire material that is wound around the outer peripheral surface of the second cylindrical portion 71B in a spiral fashion. Each of the first engagement portion 72B and the second engagement portion 72C is a protruding end portion of the wire material of the coil portion 72A protruding outward in the radial direction of the second cylindrical portion 71B.

Figure 5A:
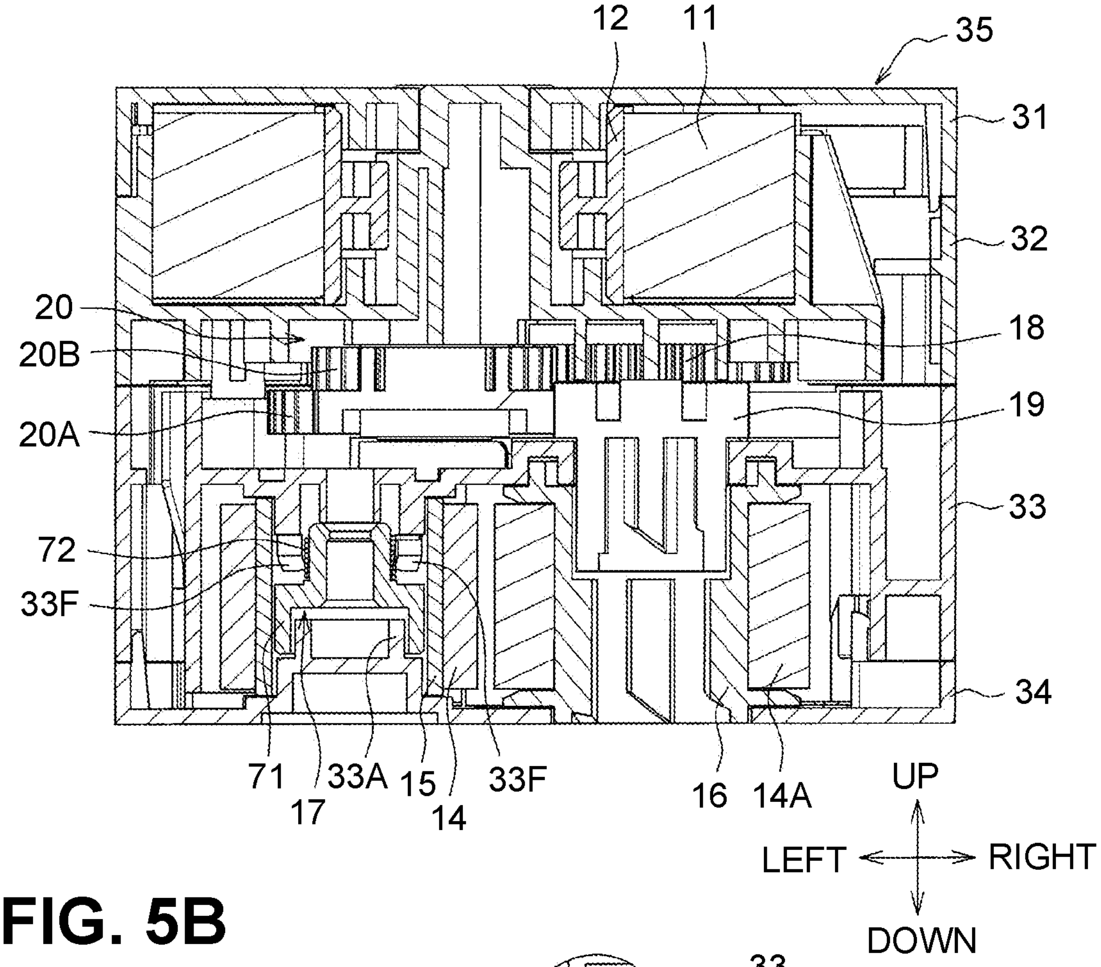
FIG. 5A is a schematic cross-sectional view taken along line V-V of FIG. 2A.
Figure 5B:
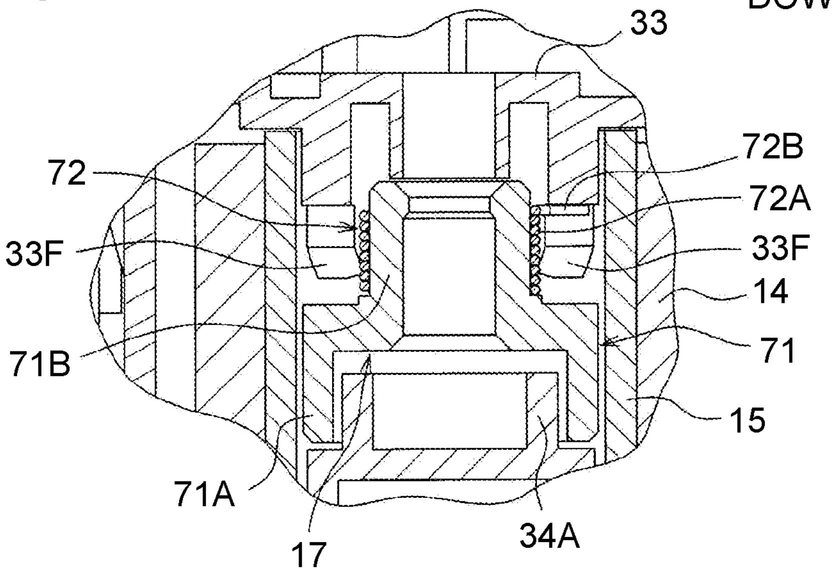
FIG. 5B is a partial enlarged view of FIG. 5A.

As illustrated in FIGS. 5A and 5B, the clutch 17 is disposed in a hollow portion of the second feed spool 15. A rotation axis of the clutch 17 is coaxial with the rotation axis of the second feed spool 15.

The second cylindrical portion 71B of the spring holder 71 and the coil portion 72A of the clutch spring 72 are disposed inside a plurality of projecting portions 33F of the second case portion 33. The first engagement portion 72B and the second engagement portion 72C of the clutch spring 72 are engaged with the projecting portions 33F.

The projection 71C (refer to FIG. 4) of the spring holder 71 is engaged with a groove defined in an inner peripheral surface of the second feed spool 15. Thus, the spring holder 71 rotates together with the second feed spool 15 about the rotation axis of the second feed spool 15.

Resistance is applied to rotation of the second feed spool 15 by sliding friction between the second cylindrical portion 71B of the spring holder 71 and the coil portion 72A of the clutch spring 72. That is, the clutch 17 applies rotational resistance to the ink ribbon roll 14. A torque for feeding (i.e., taking up) the ink ribbon may be set by the rotational resistance of the clutch 17.

The coil portion 72A of the clutch spring 72 is wound around the spring holder 71 such that a diameter of the coil portion 72A increases when the spring holder 71 rotates in the first rotation direction and decreases when the spring holder 71 rotates in a second rotation direction opposite to the first rotation direction.

When the second feed spool 15 rotates in the first rotation direction due to drawing of the ink ribbon, the diameter of the coil portion 72A increases, and therefore, sliding friction between the coil portion 72A and the second cylindrical portion 71B decreases. As a result, the rotation resistance of the second feed spool 15 is reduced.

On the other hand, when the rotation of the second feed spool 15 decreases, the diameter of the coil portion 72A decreases, and thus the rotational resistance of the second feed spool 15 increases. When the rotation of the second feed spool 15 is stopped, the sliding friction between the coil portion 72A and the second cylindrical portion 71B returns to an initial state.

(Output Gear)

The output gear 18 illustrated in FIG. 3 may be an output unit for outputting, to the outside, a driving force for conveying the to-be-printed tape. The output gear 18 is connected to be driven to the input gear 19. The output gear 18 transmits a driving force to the platen roller 103 via a platen gear 104 of the printer 100.

The output gear 18 may be an external gear including a disk that rotates about its rotation axis and teeth on a surface of the disk extending parallel to the up-down direction. One (i.e., an upper surface) of surfaces of the disk of the output gear 18 extending perpendicular to the up-down direction faces a cover portion 32B of the case 35 in the up-down direction. A portion of the other (i.e., a lower surface) of the surfaces of the disk extending perpendicular to the up-down direction does not face the case 35 in the up-down direction.

The output gear 18 is partially exposed to the head opening 33B, and thus, the exposed portion thereof is located outside the case 35. The output gear 18 is in engagement with the platen gear 104 at the head opening 33B in a state where the printing cassette 10 is mounted on a cassette mounting portion 101 of the printer 100.

The to-be-printed tape roll 11, the output gear 18, and the ink ribbon roll 14 (i.e., the second feed spool 15) are disposed in the order of the to-be-printed tape roll 11, the output gear 18, and the ink ribbon roll 14 in the up-down direction. That is, the output gear 18 is positioned between the to-be-printed tape roll 11 and the ink ribbon roll 14 in the up-down direction.

(Input Gear)

As illustrated in FIG. 3, the input gear 19 may be an input unit that is indirectly connected to the output gear 18 via an idle gear 20 and transmits a driving force to the output gear 18.

The input gear 19 engages the drive shaft 105 in a state where the printing cassette 10 is mounted on the cassette mounting portion 101 of the printer 100. A driving force from a driving source of the printer 100 is input to the input gear 19 via the drive shaft 105.

The input gear 19 has an external gear 19A and a cylindrical internal gear 19B. The entire external gear 19A and the entire internal gear 19B are accommodated in the case 35. In other words, the entire input gear 19 is accommodated in the case 35.

The external gear 19A rotates integrally with the internal gear 19B by the driving force input to the internal gear 19B. The internal gear 19B is fixed to a lower surface of the external gear 19A and has spline teeth on an inner peripheral surface thereof.

A rotation axis of the input gear 19 (i.e., a rotation axis of the external gear 19A and a rotation axis of the internal gear 19B) is coaxial with the rotation axis of the input spool 16. The input spool 16, the input gear 19, and the to-be-printed tape roll 11 are disposed in the order of the input spool 16, the input gear 19, and the to-be-printed tape roll 11 in the up-down direction.

That is, the input gear 19 is positioned between the input spool 16 and the to-be-printed tape roll 11 in the up-down direction. Further, the input gear 19 is disposed such that a portion thereof overlaps the to-be-printed tape roll 11 in the up-down direction.

The rotation axis of the input gear 19 extends in the hollow portion of the input spool 16. That is, the drive shaft 105 is inserted into the input spool 16 and the input gear 19 simultaneously. As a result, although the input gear 19 is not directly coupled to the input spool 16, the input gear 19 is rotated by a driving source (i.e., the drive shaft 105) common to the input spool 16.

(Idle Gear)

The idle gear 20 is a transmission gear that is connected to be driven to (i.e., is in engagement with) the input gear 19 and the output gear 18 and transmits the driving force input to the input gear 19 to the output gear 18.

The idle gear 20 is a stepped gear in which a first gear 20A engaged with the input gear 19 and a second gear 20B engaged with the output gear 18 are arranged coaxially. The second gear 20B has a diameter smaller than the first gear 20A.

The second gear 20B is disposed at a position closer to the to-be-printed tape roll 11 than the second gear 20B to the first gear 20A in the up-down direction (i.e., on an upper side). The idle gear 20 constitutes a deceleration mechanism that decelerates the driving force input to the input gear 19.

(Case)

The first cover portion 31 serves as an upper end portion of the printing cassette 10. The first case portion 32 is disposed below the first cover portion 31 and is connected to the first cover portion 31 in the up-down direction. The second case portion 33 is disposed below the first case portion 32 and is connected to the first case portion 32 in the up-down direction. The second cover portion 34 serves as a lower end portion of the printing cassette 10. The second cover portion 34 is connected to the second case portion 33 in the up-down direction.

The first cover portion 31 and the first case portion 32 accommodate the to-be-printed tape roll 11. That is, the to-be-printed tape roll 11 is disposed in a space surrounded by the first cover portion 31 and the first case portion 32.

The second cover portion 34 and the second case portion 33 accommodate the ink ribbon roll 14, the second feed spool 15, and the input spool 16. That is, the ink ribbon roll 14, the second feed spool 15, and the input spool 16 are disposed in a space surrounded by the second cover portion 34 and the second case portion 33.

The first case portion 32 and the second case portion 33 are connected to each other. A portion of the output gear 18, the input gear 19, and the idle gear 20 are disposed in a space surrounded by the first case portion 32 and the second case portion 33.

The first case portion 32 includes a first sidewall 32A, a cover portion 32B, a first guide 32C, a first shaft portion 32D, a second shaft portion 32E, a third shaft portion 32F, and an inner wall 32G. The first sidewall 32A defines side surfaces of the printing cassette 10. The side surfaces of the printing cassette 10 extend parallel to the up-down direction.

The cover portion 32B has surfaces perpendicular to the up-down direction. The cover portion 32B is disposed at a position where the cover portion 32B overlaps the output gear 18 in the up-down direction. In the illustrative embodiment, the cover portion 32B is contiguous with a lower end portion of the first sidewall 32A, and is disposed at a right front corner of the first case portion 32.

The output gear 18, the cover portion 32B, and the to-be-printed tape roll 11 are arranged next to each other in the order of the output gear 18, the cover portion 32B, and the to-be-printed tape roll 11 in the up-down direction. As described above, an upper surface of the output gear 18 is entirely covered by the cover portion 32B.

Figure 6:
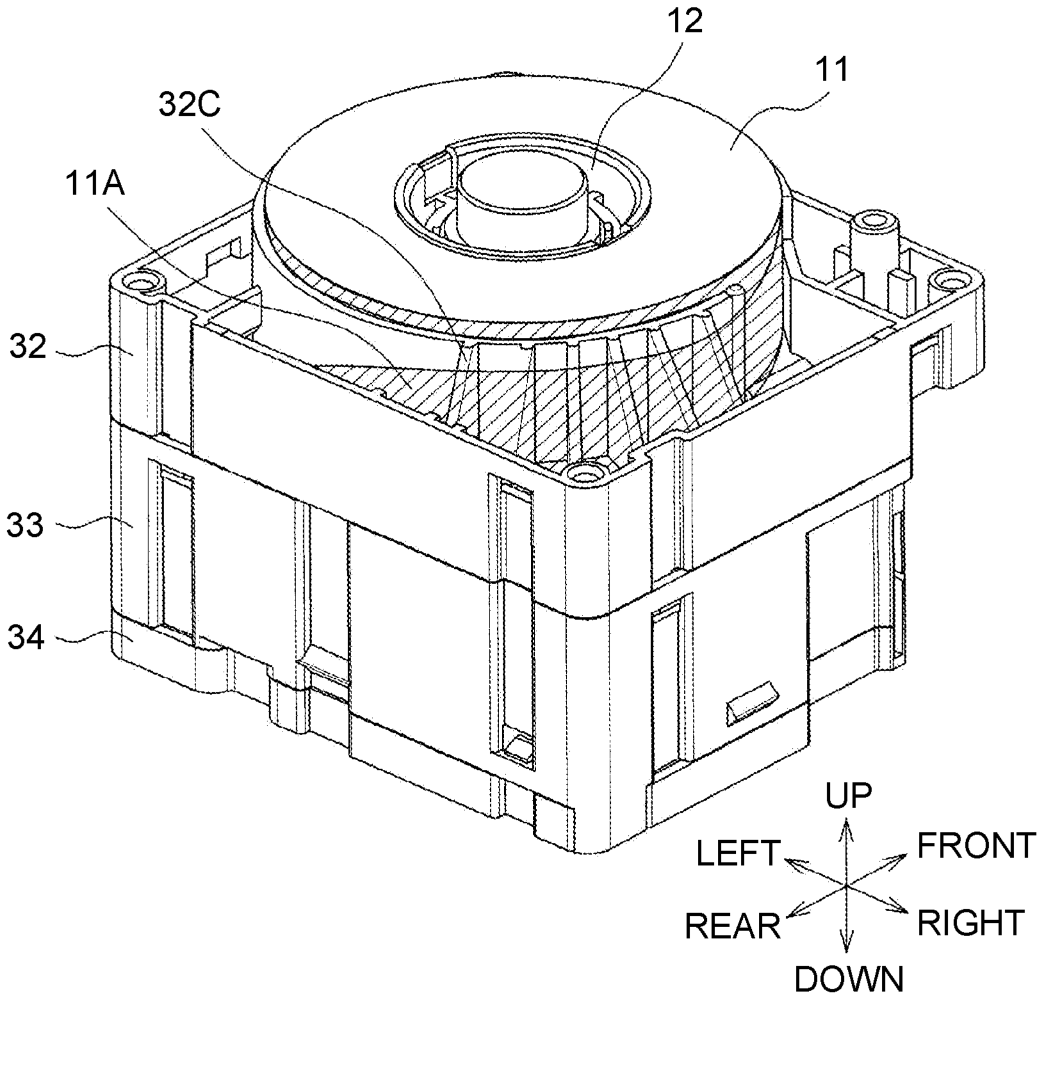
FIG. 6 is a schematic perspective view illustrating a state in which a first cover portion of the printing cassette of FIG. 2A is removed.

As illustrated in FIG. 6, the first guide 32C is a portion around which the to-be-printed tape 11A drawn from the to-be-printed tape roll 11 is wound. The first guide 32C has a plurality of ribs being plates that are apart from each other in a circumferential direction of the to-be-printed tape roll 11. The plurality of ribs protrude in a radial direction of the to-be-printed tape roll 11, and a protruding amount of each of the plurality of ribs (i.e., a plate width) increases as each of the plurality of ribs extends downward.

The first shaft portion 32D illustrated in FIG. 3 supports the output gear 18 such that the output gear 18 is rotatable about its rotation axis parallel to the up-down direction. The second shaft portion 32E supports the input gear 19 such that the input gear 19 rotates about its rotation axis parallel to the up-down direction. The third shaft portion 32F supports the idle gear 20 such that the idle gear 20 rotates about its rotation axis parallel to the up-down direction. The first shaft portion 32D, the second shaft portion 32E, and the third shaft portion 32F protrude from the inner wall 32G.

The second case portion 33 includes a second sidewall 33A, the head opening 33B, an outlet 33C, a second guide 33D, a protruding portion 33E, and the plurality of projecting portions 33F. The second sidewall 33A defines side surfaces of the printing cassette 10. The side surfaces of the printing cassette 10 extend parallel to the up-down direction.

The head opening 33B is a cutaway portion of the second sidewall 33A. The head opening 33B is a space in which the print head 102 is located by insertion into the head opening 33B from below in a state where the printing cassette 10 is mounted to the printer 100. The head opening 33B opens downward in the printing cassette 10.

The second guide 33D is a portion around which a to-be-printed tape 11A that has passed the first guide 32C. As with the first guide 32C, the second guide 33D has a plurality of ribs being plates that are apart from each other in a circumferential direction of the ink ribbon roll 14. The plurality of ribs protrude in a radial direction of the ink ribbon roll 14, and a protruding amount of each of the plurality of ribs (i.e., a plate width) decreases as each of the plurality of ribs extends downward.

The protruding portion 33E is disposed at a position where the protruding portion 33E overlaps the output gear 18 in the up-down direction. The protruding portion 33E is disposed below the output gear 18 (i.e., on the side opposite to the cover portion 32B across the output gear 18).

The print head 102 of the printer 100 is inserted into an area below the protruding portion 33E. Thus, in a state where the printing cassette 10 is mounted on the cassette mounting portion 101 of the printer 100, the output gear 18 is disposed upstream from (i.e., upper side of) the print head 102 in a mounting direction of the printing cassette 10 onto the cassette mounting portion 101.

As illustrated in the FIG. 5A, the plurality of projecting portions 33F are disposed along a circumferential direction of the second cylindrical portion 71B of the clutch 17 to surround the second cylindrical portion 71B and the coil portion 72A of the clutch 17. The first engagement portion 72B and the second engagement portion 72C of the clutch spring 72 are inserted between the projecting portions 33F.

A fourth shaft portion 34A provided at the second cover portion 34 is inserted into the first cylindrical portion 71A of the clutch 17. The second feed spool 15 is rotatably supported by the fourth shaft portion 34A via the first cylindrical portion 71A.

Figure 7:
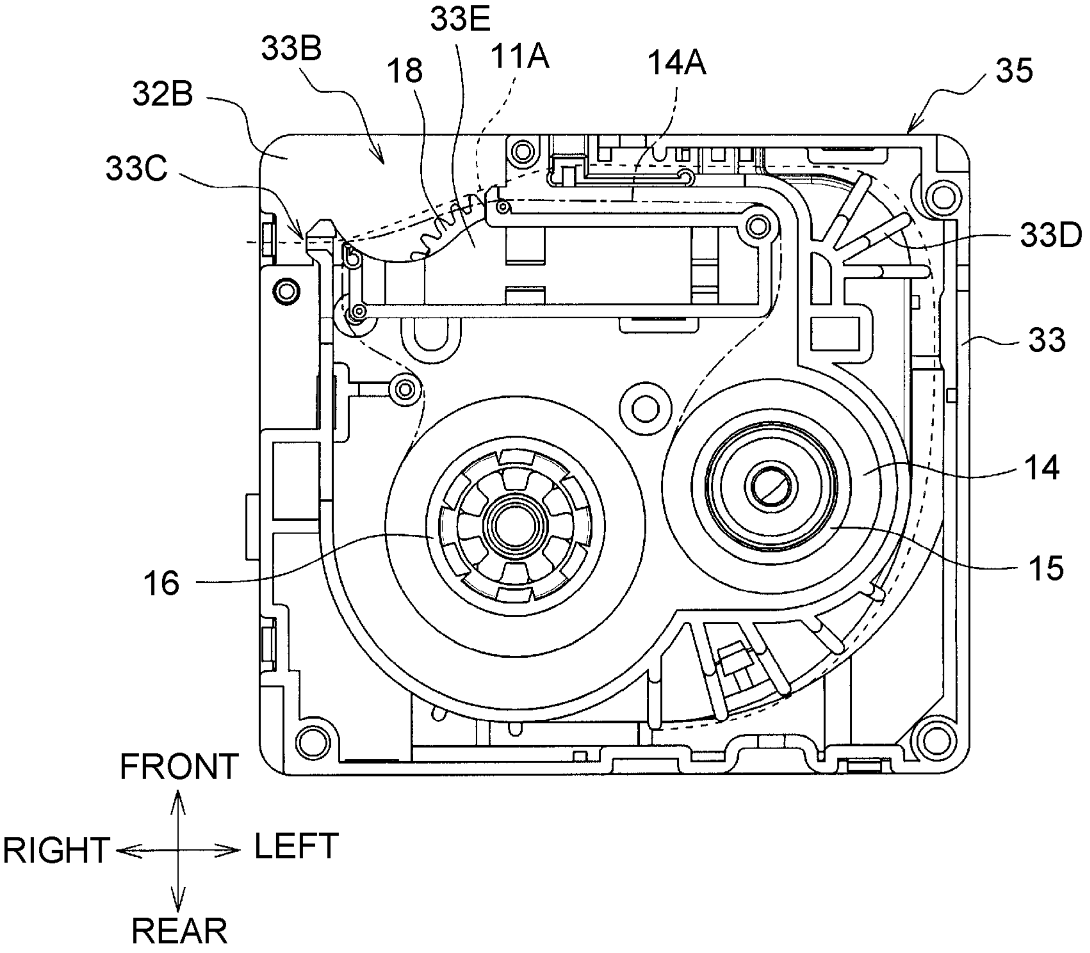
FIG. 7 is a perspective view for explaining a path of a to-be-printed tape and a path of an ink ribbon in the printing cassette of FIG. 2A.

As illustrated in FIG. 7, the to-be-printed tape 11A and the ink ribbon 14A extend across the head opening 33B in the right-left direction. The to-be-printed tape 11A on which printing has been performed is discharged to the outside of the printing system 1 from the outlet 33C.

As illustrated in FIGS. 8A, 8B, 8C, and 8D, the first guide 32C and the second guide 33D define a path through which the to-be-printed tape 11A constituting the to-be-printed tape roll 11 is fed from the first case portion 32 to the second case portion 33.

Figure 8A:
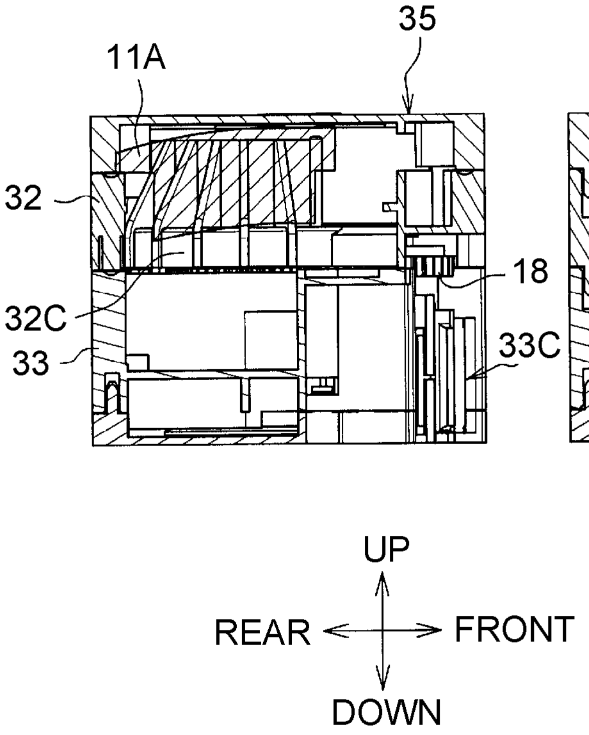
FIG. 8A is a schematic cross-sectional view taken along line VIIIA-VIIIA of FIG. 2C
Figure 8B:
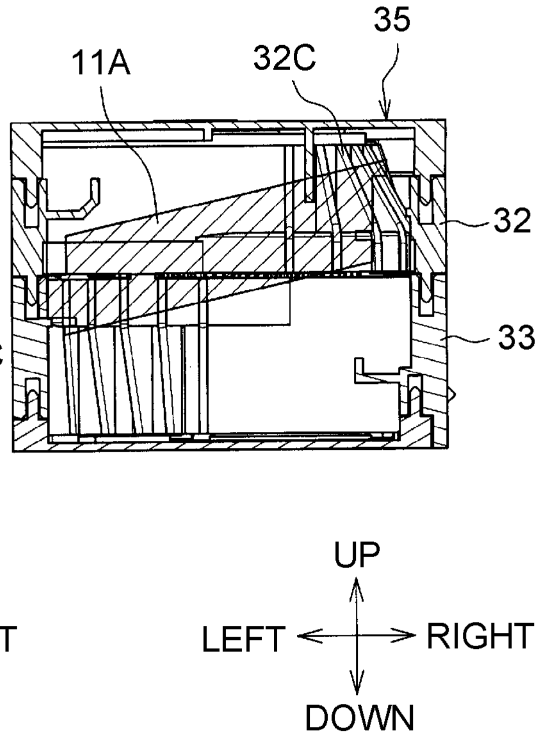
FIG. 8B is a schematic cross-sectional view taken along line VIIIB-VIIIB of FIG. 2C.

Specifically, as illustrated in FIG. 8A, the to-be-printed tape 11A drawn from the to-be-printed tape roll 11 is conveyed in a spiral manner toward the lower rear in the first case portion 32 while contacting the first guide 32C from an outer side in the radial direction of the to-be-printed tape roll 11. As illustrated in FIG. 8B, the to-be-printed tape 11A is further conveyed toward the lower left while extending across a connected portion of the first case portion 32 and the second case portion 33 in the up-down direction.

Figure 8C:
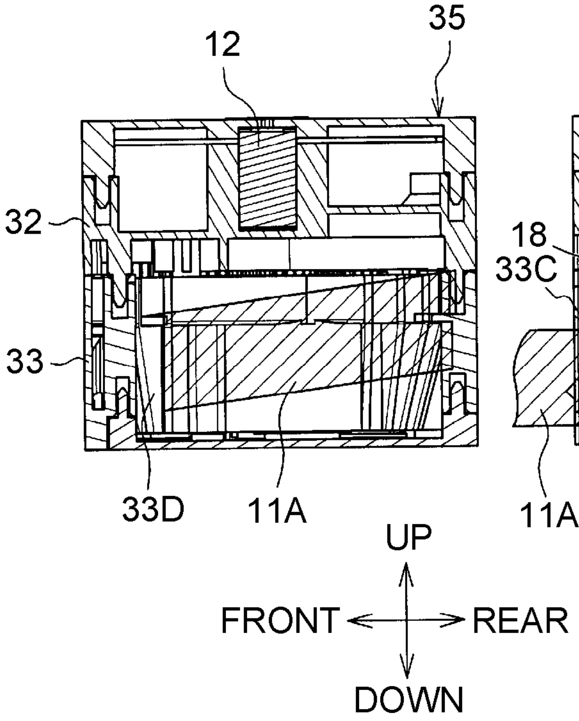
FIG. 8C is a schematic cross-sectional view taken along line VIIIC-VIIIC of FIG. 2C.
Figure 8D:
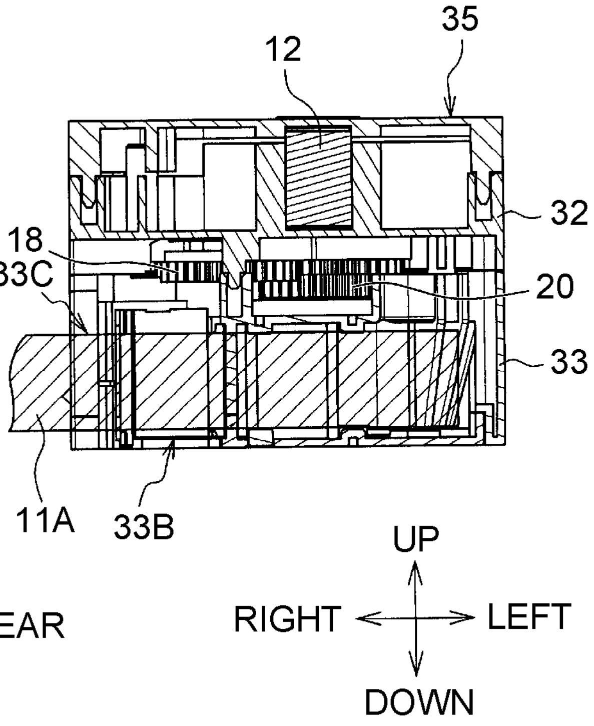
FIG. 8D is a schematic cross-sectional view taken along line VIIID-VIIID of FIG. 2C.
Figure 9:
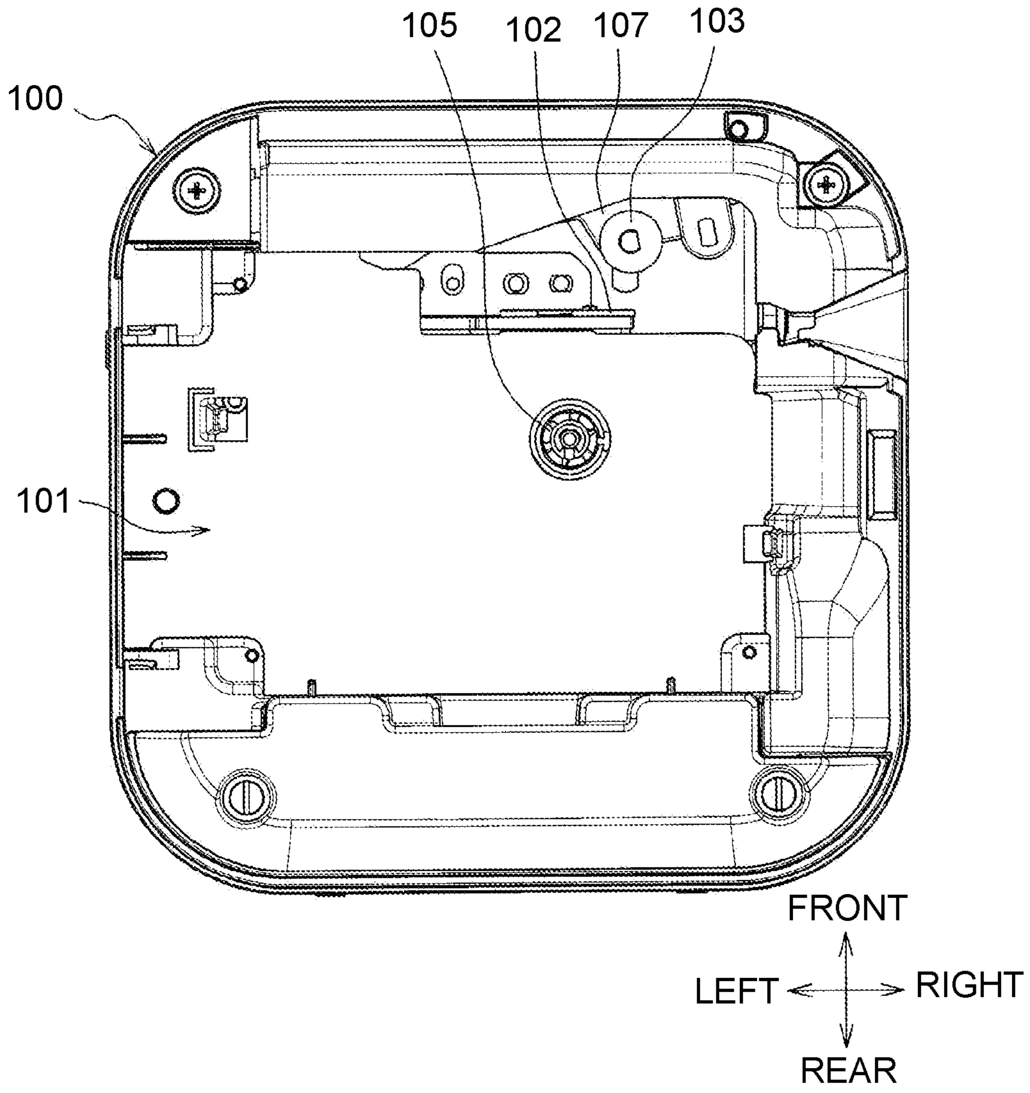
FIG. 9 is a schematic plan view illustrating the printer in the printing system of FIG. 1A.

As illustrated in FIG. 8C, the to-be-printed tape 11A that has reached the second case portion 33 is conveyed toward the lower front with contacting the second guide 33D from the outer side in the radial direction. As illustrated in FIG. 8D, the to-be-printed tape 11A that has reached the lower end portion of the printing cassette 10 passes the head opening 33B and is then discharged from the outlet 33C.

<Printer>

As illustrated in FIG. 1B, the printer 100 includes the cassette mounting portion 101, the print head 102, the platen roller 103, the platen gear 104, the driving source, the drive shaft 105, and a movable unit.

(Cassette Mounting Portion)

The cassette mounting portion 101 is a recessed portion on which the printing cassette 10 may be mounted in an axial direction (i.e., the up-down direction) of the rotation axis of the drive shaft 105. The cassette mounting portion 101 has a function of positioning the printing cassette 10.

(Print Head)

The print head 102 is a device for performing printing on the to-be-printed tape held by the printing cassette 10.

The print head 102 is disposed in the cassette mounting portion 101. The print head 102 is disposed such that, in a state where the printing cassette 10 is mounted on the printer 100, the print head 102 overlaps the to-be-printed tape and the ink ribbon in the front-rear direction at the head opening 33B.

The print head 102 has a plurality of heating elements, heat generation of which are individually controlled. The to-be-printed tape that has been conveyed to the head opening 33B by the platen roller 103 is pressed toward the print head 102 in which the heating elements have generated heat, via the ink ribbon. Thus, some ink on a particular surface of the ink ribbon is transferred onto the to-be-printed tape, and characters, symbols, and other representations are printed on the to-be-printed tape.

(Platen Roller)

The platen roller 103 is a roller for conveying the to-be-printed tape from the inside to the outside of the printing cassette 10 by a driving force transmitted from the output gear 18. A rotation axis of the platen roller 103 is parallel to the up-down direction.

The platen roller 103 is disposed facing the print head 102 in the cassette mounting portion 101. The platen roller 103 contacts and presses the to-be-printed tape toward the print head 102 at the head opening 33B.

(Platen Gear)

The platen gear 104 may be an external gear that is connected to be driven to the platen roller 103 and is to be engaged with the output gear 18.

In the illustrative embodiment, a rotation axis of the platen gear 104 is coaxial with the rotation axis of the platen roller 103. In addition, the platen gear 104 is disposed upstream from (i.e., above) the platen roller 103 in the mounting direction of the printing cassette 10 to the cassette mounting portion 101.

(Movable Unit)

The movable unit 107 is attached to a housing 110 so as to be swingable in a plane perpendicular to the up-down direction. The platen roller 103 and the platen gear 104 are supported by the movable unit 107 so as to be swingable with respect to the housing 110.

Figure 10A:
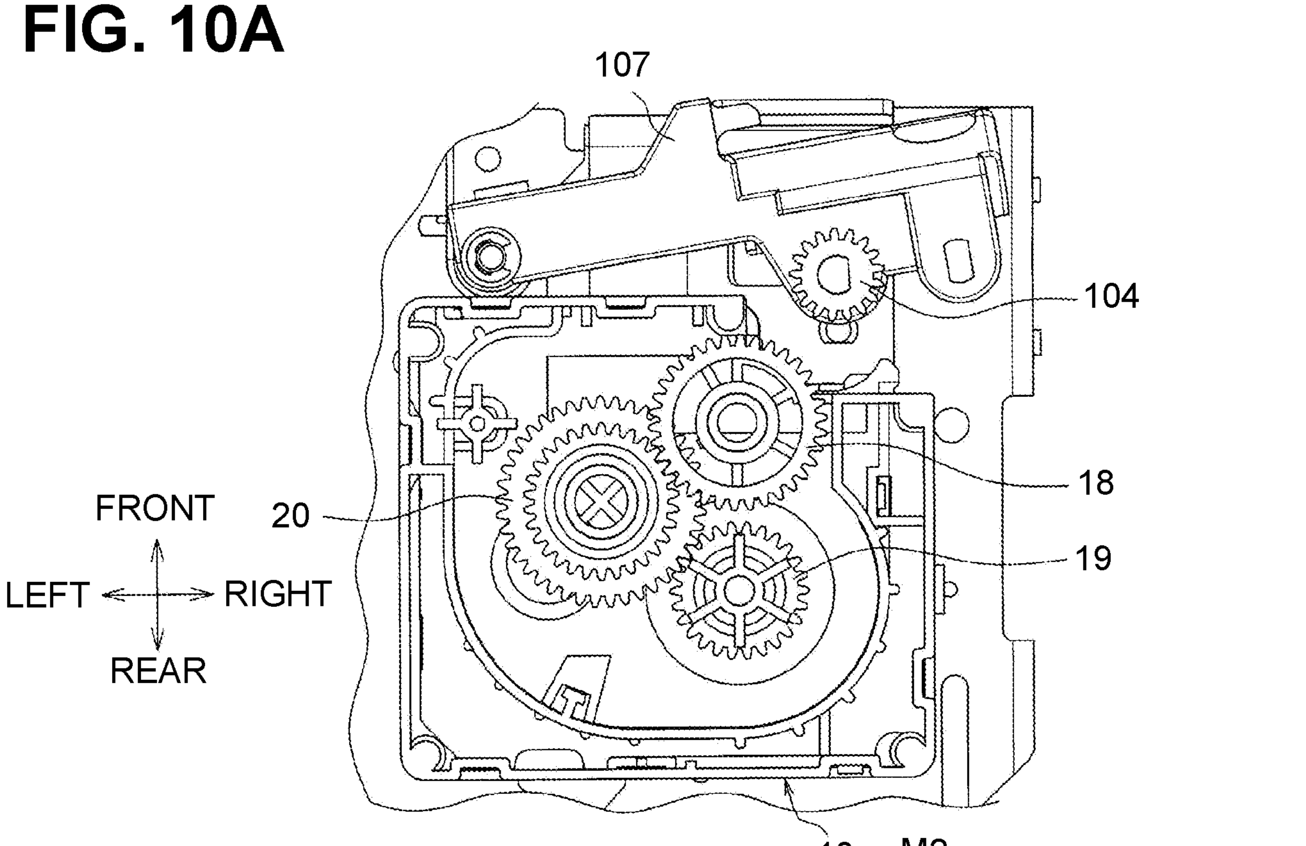
FIG. 10A is a schematic view illustrating a separated state in which an output gear and a platen gear are separated in the printing system of FIG. 1A.
Figure 10B:
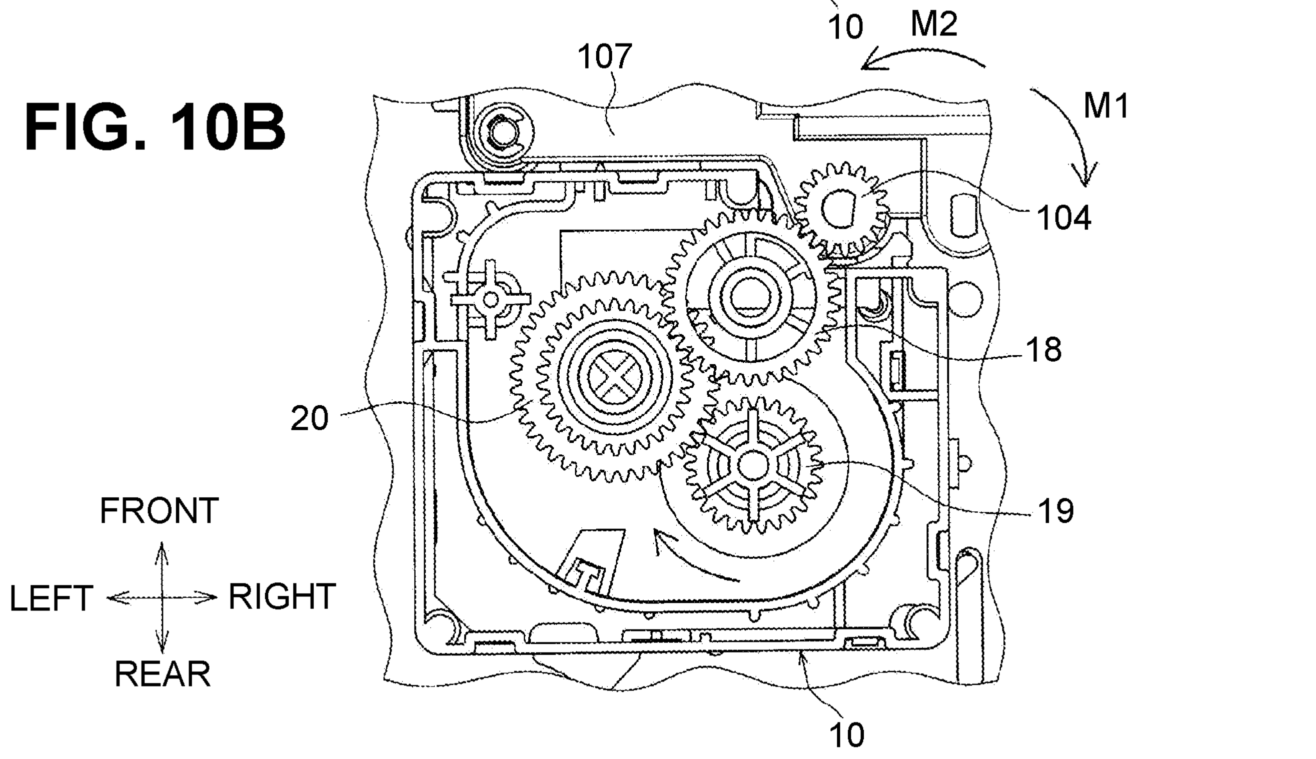
FIG. 10B is a schematic view illustrating an engaged state in which the output gear and the platen gear are engaged in the printing system of FIG. 1A.

The platen roller 103 and the platen gear 104 are swingable between a position illustrated in FIG. 10A where the platen roller 103 and the platen gear 104 are spaced from the printing cassette 10 and a position illustrated in FIG. 10B where the platen gear 104 is in engagement with the output gear 18 by swinging of the movable unit 107.

(Drive Shaft)

The drive shaft 105 illustrated in FIG. 1B is a shaft that is engaged with the input gear 19 when the drive shaft 105 is inserted into the input spool 16, and that rotates the input spool 16 and the input gear 19. The drive shaft 105 has external teeth that is to be engaged with the spline teeth 16B of the input spool 16 and the internal gear 19B of the input gear 19.

The drive shaft 105 is disposed in the cassette mounting portion 101. A rotation axis of the drive shaft 105 is parallel to the up-down direction. The drive shaft 105 is rotatable about its rotation axis by a driving source (e.g., a motor). The driving source generates a driving force to be input to the printing cassette 10.

In a state where the printing cassette 10 is mounted on the cassette mounting portion 101, at least a portion of the drive shaft 105 is positioned in the input spool 16. In this state, the drive shaft 105 is engaged with the input gear 19 and the platen gear 104 is engaged with the output gear 18.

Specifically, the drive shaft 105 is inserted into the input spool 16 and the input gear 19 of the printing cassette 10, and the platen roller 103 and the platen gear 104 are swung toward the head opening 33B of the printing cassette 10, whereby the printing cassette 10 is mounted on the printer 100.

As the input gear 19 is rotated by the drive shaft 105 in a state where the printing cassette 10 is mounted, the output gear 18 is rotated, the platen gear 104 is rotated by the rotation of the output gear 18, and the platen roller 103 is rotated by the rotation of the platen gear 104.

As illustrated in 10B, a direction M1 of a moment about the drive shaft 105 occurring in the printing cassette 10 by conveyance of the to-be-printed tape by the platen roller 103 in a state where the printing cassette 10 is mounted on the cassette mounting portion 101 is the same direction as a drive rotation direction S of the drive shaft 105.

On the other hand, a direction M2 of a moment about the drive shaft 105 occurring in the printing cassette 10 by reaction received by the output gear 18 from the platen gear 104 in a state where the printing cassette 10 is mounted on the cassette mounting portion 101 is opposite to the drive rotation direction S of the drive shaft 105.

1-2. Effects

According to the illustrative embodiment described in detail above, the following effects may be obtained.

(1a) The driving force from the driving source of the printer 100 is transmitted to the platen roller 103 via the input gear 19 and the output gear 18 in the printing cassette 10.

That is, the driving force is transmitted to the platen roller 103 only when the printing cassette 10 is mounted on the printer 100. Therefore, an unexpected rotation of the platen roller 103 may be reduced in a state where the printing cassette 10 is not mounted.

(1b) The input gear 19 has the internal gear 19B that is engaged with the external teeth of the drive shaft 105, and the output gear 18 and the platen gear 104 are external gears that are engaged with each other. Thus, a higher flexibility may be achieved in placement of gear trains in the printing cassette 10 and the printer 100.

(1c) The driving force may be transmitted from the single drive shaft 105 to the input spool 16 and the input gear 19 at different positions in the axial direction of the rotation axis of the input spool 16 (i.e., the insertion direction of the drive shaft 105). Thus, a driving force may be input to both the input spool 16 and the input gear 19 while upsizing of the printing cassette 10 in directions perpendicular to the insertion direction of the drive shaft 105 (i.e., the front-rear direction and the left-right direction) may be avoided.

(1d) The platen gear 104 is disposed upstream from the platen roller 103 in the mounting direction of the printing cassette 10 to the cassette mounting portion 101. Thus, interference between the output gear 18 and the print head 102 may be avoided. Accordingly, upsizing of the cassette due to increase in size of the head opening 33B.

(1e) The direction M1 of the moment about the drive shaft 105 occurring in the printing cassette 10 by conveyance of the to-be-printed tape by the platen roller 103 is opposite to the direction M2 of the moment about the drive shaft 105 occurring in the printing cassette 10 by reaction received by the output gear 18 from the platen gear 104. Thus, the printing cassette 10 may be prevented from rotating in the printer 100.

(1f) The take-up torque of the ink ribbon may be adjusted by the clutch 17. Thus, ink ribbons having, for example, different widths, thicknesses, and materials may be installed in the printing cassettes 10 having the same shape.

2. Second Illustrative Embodiment

2-1. Configuration

Figure 11A:
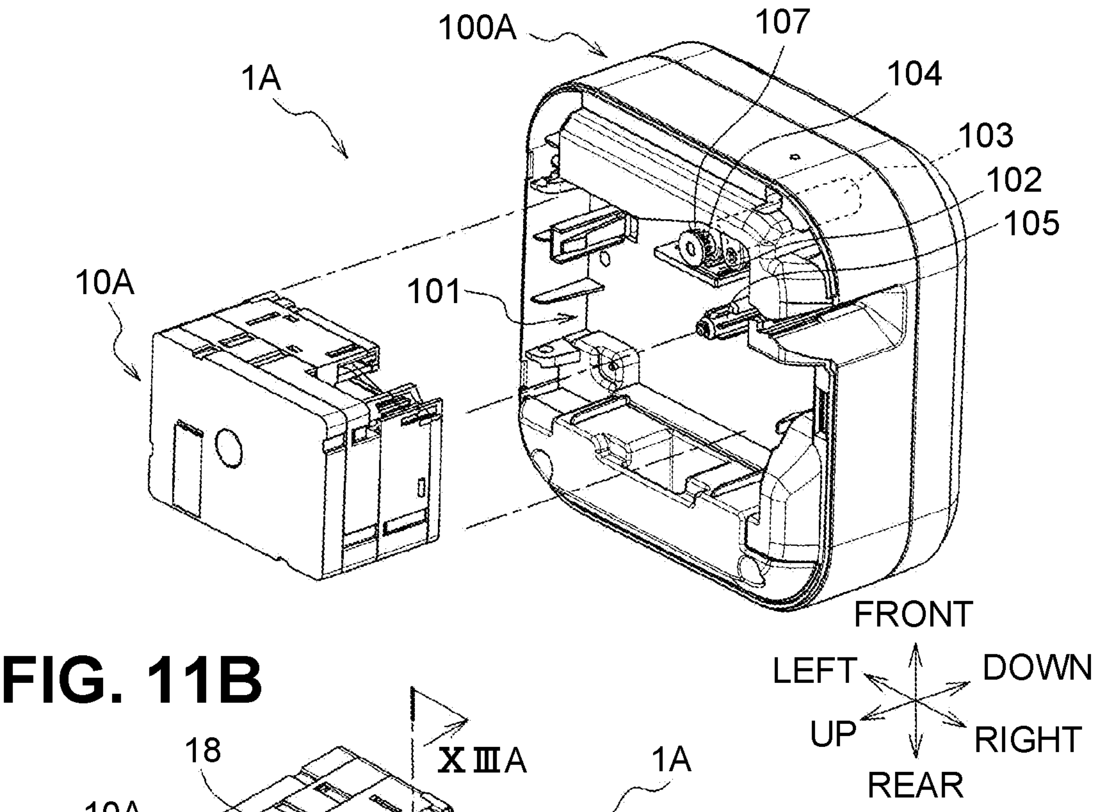
FIGS. 11A and 11B are schematic perspective views each illustrating a state in which a printing cassette is detached from a printer in a printing system er according to an illustrative embodiment different from the illustrative embodiment illustrated in FIG. 1A.
Figure 11B:
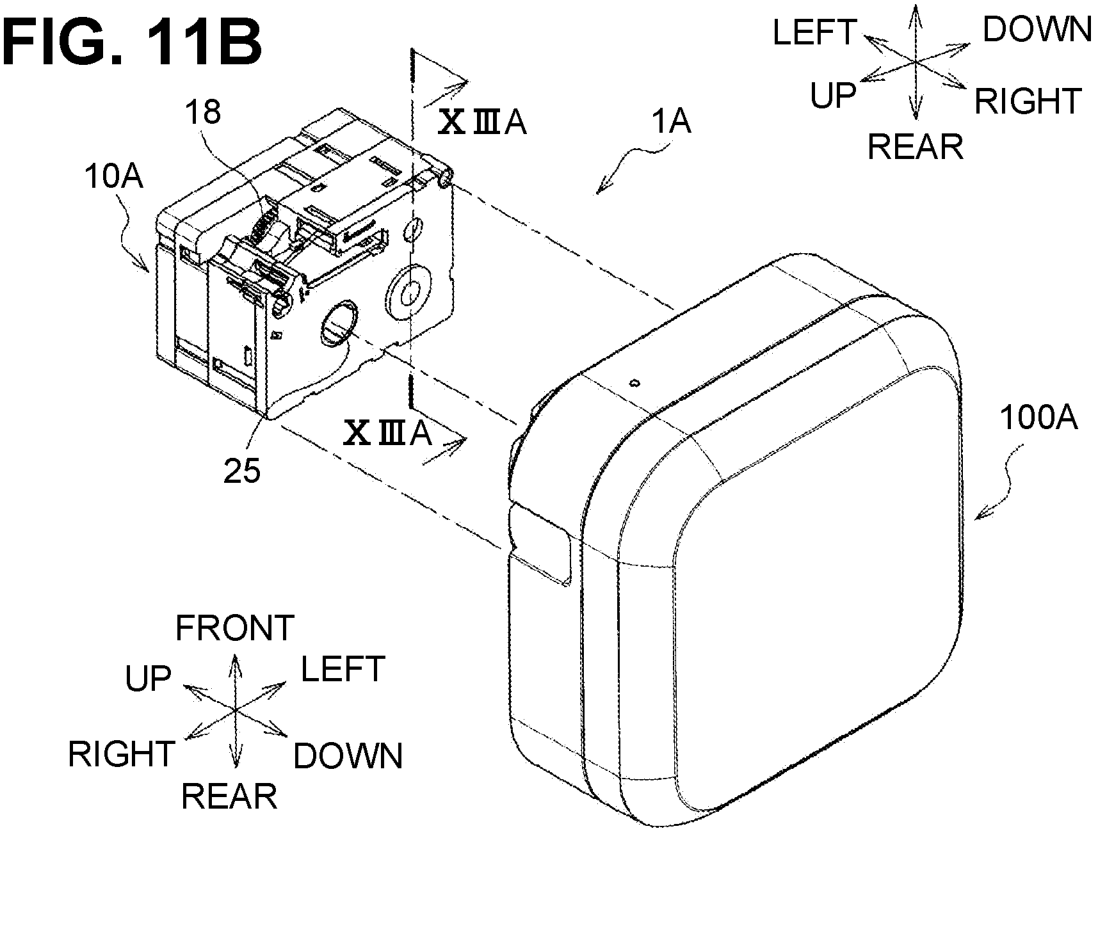

A printing system 1A illustrated in FIGS. 11A, 11B includes a printing cassette 10A and a printer 100A.

<Printing Cassette>

Figure 12:
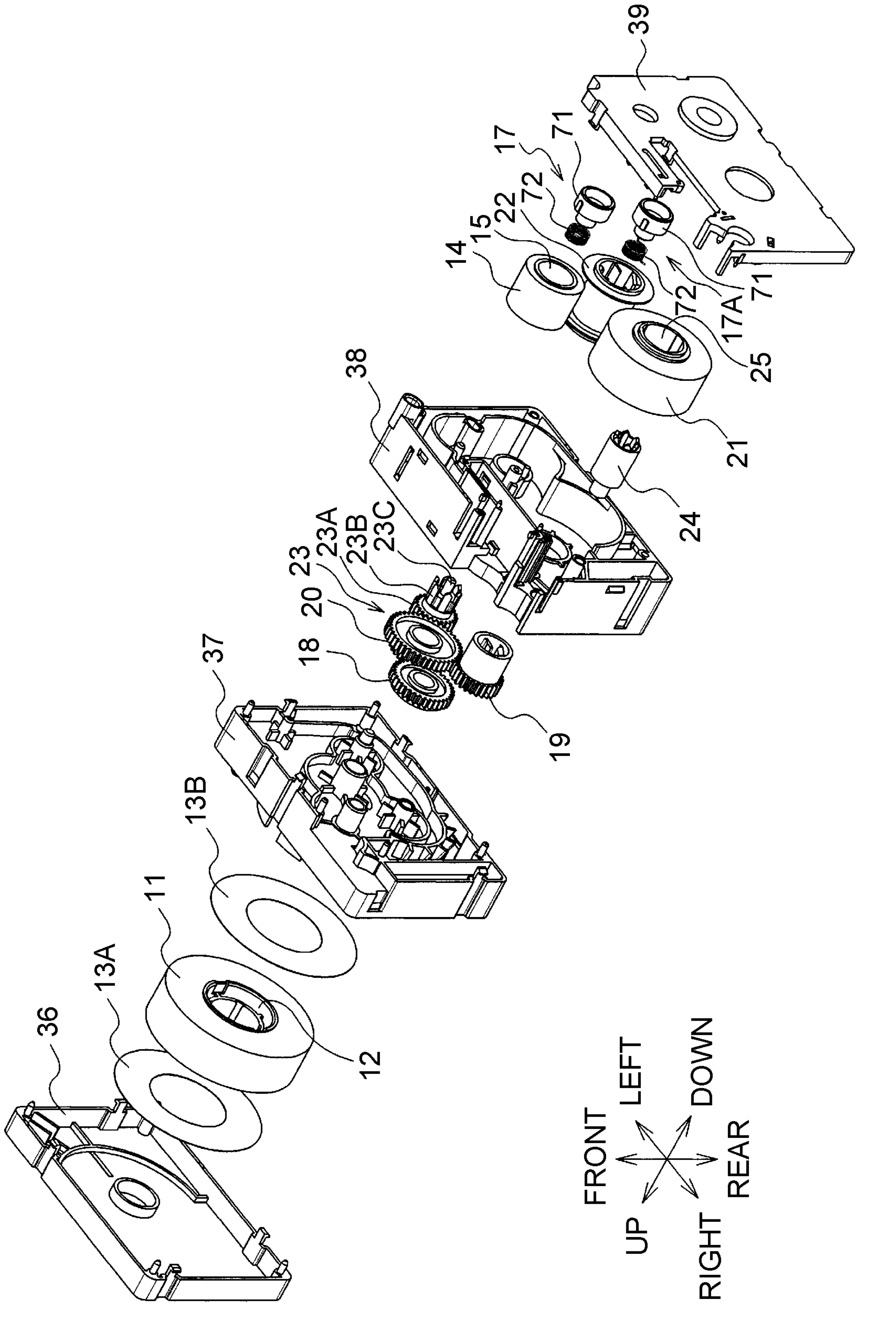
FIG. 12 is a disassembled schematic perspective view of the printing cassette in the printing system of FIG. 11A.

The printing cassette 10A is identical to the printing cassette 10 of the first illustrative embodiment to which a laminating tape roll 21, an additional spool 22, an additional gear 23, a pinch roller 24, and a second clutch 17A illustrated in FIG. 12.

The printing cassette 10A includes a third feed spool 25, a first cover portion 36, a first case portion 37, a second case portion 38, and a second cover portion 39 as alternatives to the input spool 16, the first cover portion 31, the first case portion 32, the second case portion 33, and the second cover portion 34 of the printing cassette 10 of the first illustrative embodiment.

The third feed spool 25 is identical to the input spool 16 except that the third feed spool 25 does not have the spline teeth 16B. The first cover portion 36, the first case portion 37, the second case portion 38, and the second cover portion 39 are identical to the first cover portion 31, the first case portion 32, the second case portion 33, and the second cover portion 34 that are further extended in the right-left direction, respectively. The other configurations of the printing cassette 10A are the same as those of the printing cassette 10 of the first illustrative embodiment except for the points described below, and thus a description thereof will be omitted.

In the laminating tape roll 21, a laminating tape used for protecting the to-be-printed tape is wound around the third feed spool 25. The laminating tape has an adhesive surface to be adhered to the to-be-printed tape on which printing has been performed by the print head 102.

The additional spool 22 is rotatable about its rotation axis. The rotation axis of the additional spool 22 is parallel to the rotation axis of the second feed spool 15 (i.e., the up-down direction). The additional spool 22 is a take-up spool that takes up the ink ribbon by rotation of the additional gear 23.

The additional gear 23 is connected to the additional spool 22 and is in engagement with the idle gear 20. The additional gear 23 is rotated by a driving force input to the input gear 19 and rotates the additional spool 22.

The additional gear 23 has an external gear 23A, a plurality of projecting portions 23B, and a shaft portion 23C. The external gear 23A has a rotation axis that is parallel to the up-down direction. The plurality of projecting portions 23B are disposed around the shaft portion 23C along a peripheral surface of the shaft portion 23C. The plurality of projecting portions 23B and the shaft portion 23C protrude downward from the external gear 23A.

The pinch roller 24 presses the laminating tape toward the to-be-printed tape on which printing has been performed, in cooperation with a pressing roller 106. The pinch roller 24 is disposed downstream from the head opening 33B in the conveyance direction of the to-be-printed tape.

The second clutch 17A connects the input gear 19 to be driven to the additional spool 22. Specifically, the second clutch 17A connects the additional gear 23 that is connected to be driven to the input gear 19, to be driven to the additional spool 22. The second clutch 17A includes a spring holder 71 similar to the clutch 17, and a clutch spring 72.

Figure 13A:
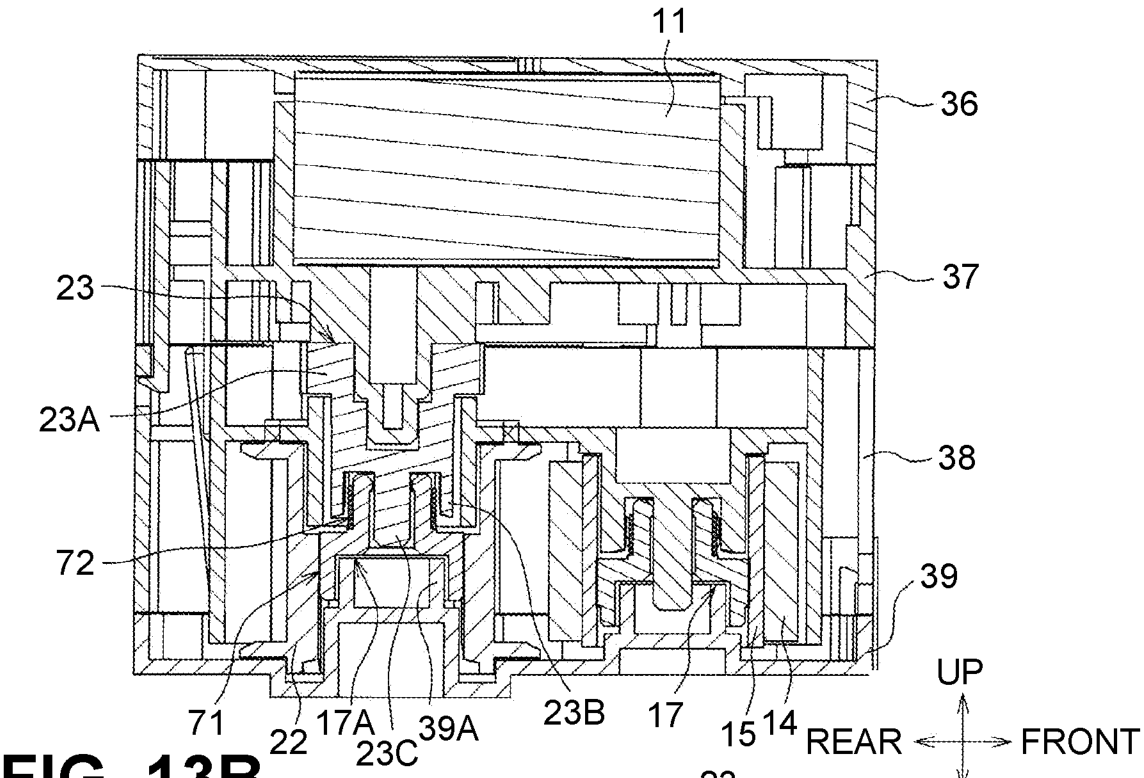
FIG. 13A is a schematic cross-sectional view taken along line XIIIA-XIIIA of FIG. 11B.
Figure 13B:
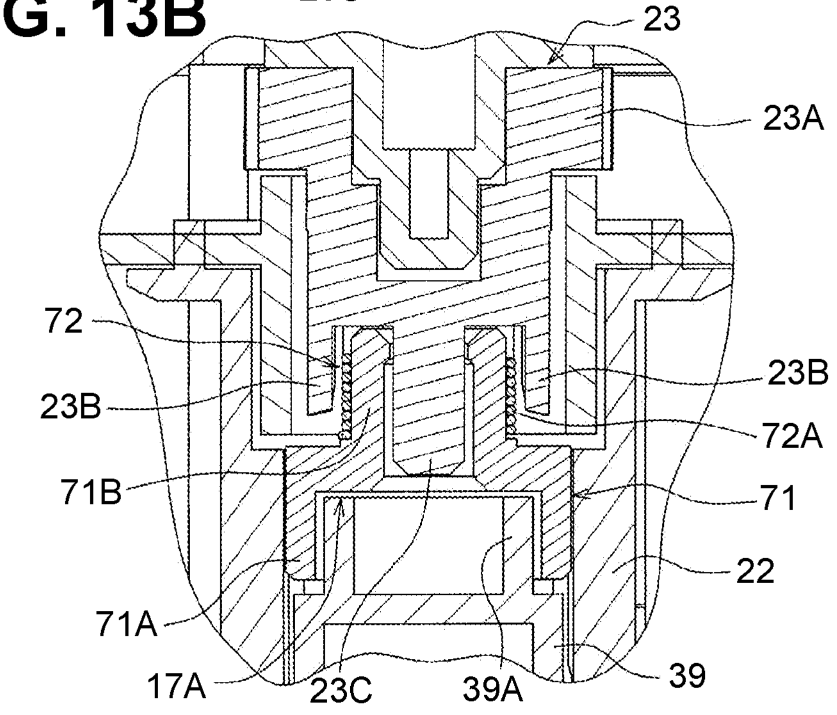
FIG. 13B is a partial enlarged view of FIG. 13A.

As illustrated in FIGS. 13A and 13B, a second cylindrical portion 71B and a coil portion 72A of the second clutch 17A are disposed inside the plurality of projecting portions 23B of the additional gear 23. Further, the shaft portion 23C of the additional gear 23 is inserted into the second cylindrical portion 71B.

A first cylindrical portion 71A of the second clutch 17A is fixed to an inner peripheral surface of the additional spool 22. A first engagement portion and a second engagement portion of the second clutch 17A are engaged with the plurality of projecting portions 23B of the additional gear 23.

A fifth shaft portion 39A provided at the second cover portion 39 is inserted into the first cylindrical portion 71A of the second clutch 17A. The additional spool 22 is rotatably supported by the fifth shaft portion 39A via the first cylindrical portion 71A.

Resistance is applied to the additional spool 22 by sliding friction between the second cylindrical portion 71B of the spring holder 71 of the second clutch 17A and the coil portion 72A of the clutch spring 72. That is, the second clutch 17A applies rotational resistance to the take-up spool for the ink ribbon. A torque for taking up the ink ribbon may be set by the rotational resistance of the second clutch 17A.

Further, in the illustrative embodiment, rotational resistance is applied to the laminating tape roll 21 by the clutch 17 that is the same as that used in the first illustrative embodiment.

<Printer>

The printer 100A is identical to the printer 100 of the first illustrative embodiment to which the pressing roller 106 illustrated in FIG. 12 is added. The other configurations of the printer 100A are the same as those of the printer 100 of the first illustrative embodiment except for the points described below, and thus a description thereof will be omitted.

Figure 14:
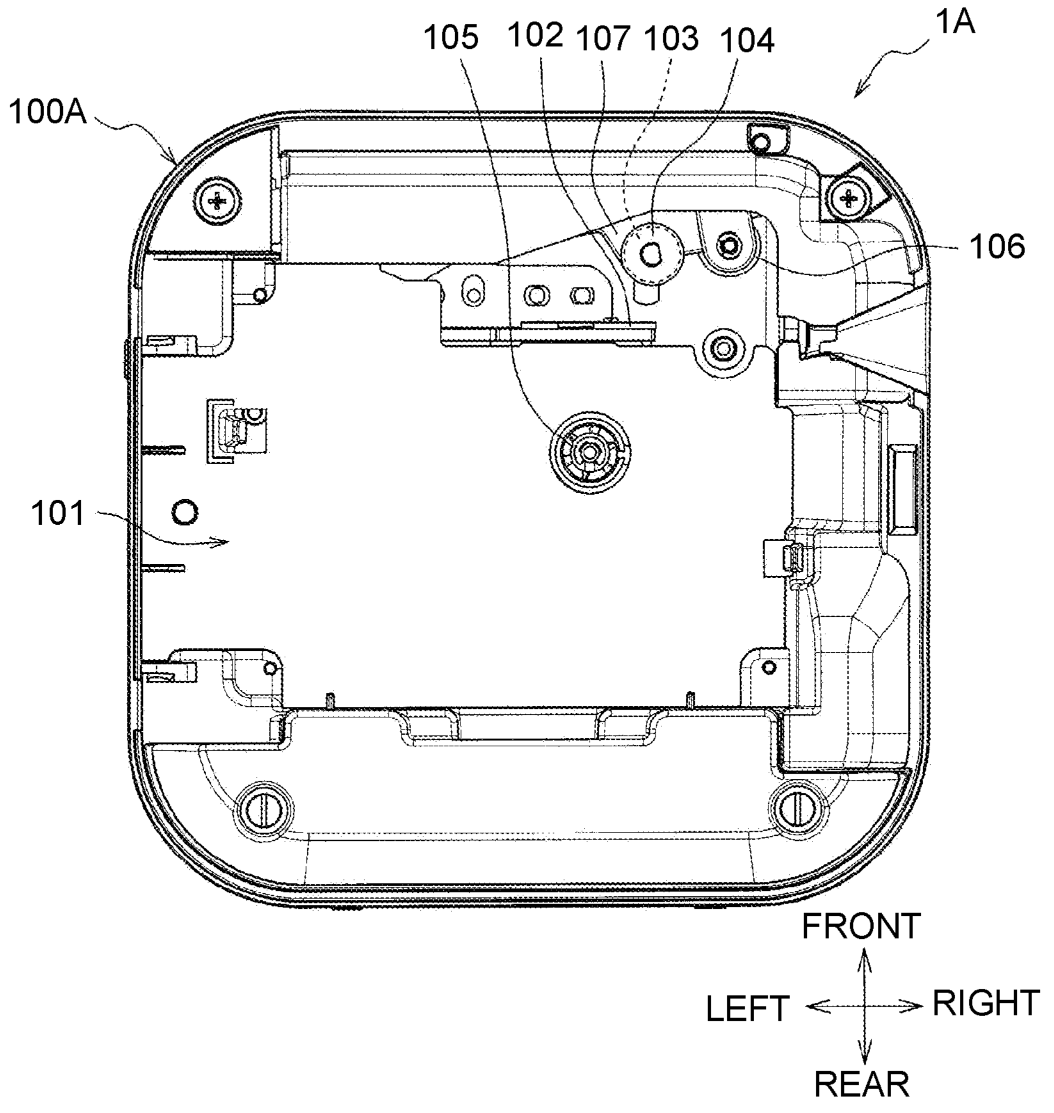
FIG. 14 is a schematic plan view illustrating the printer in the printing system of FIG. 11A.
Figure 15A:
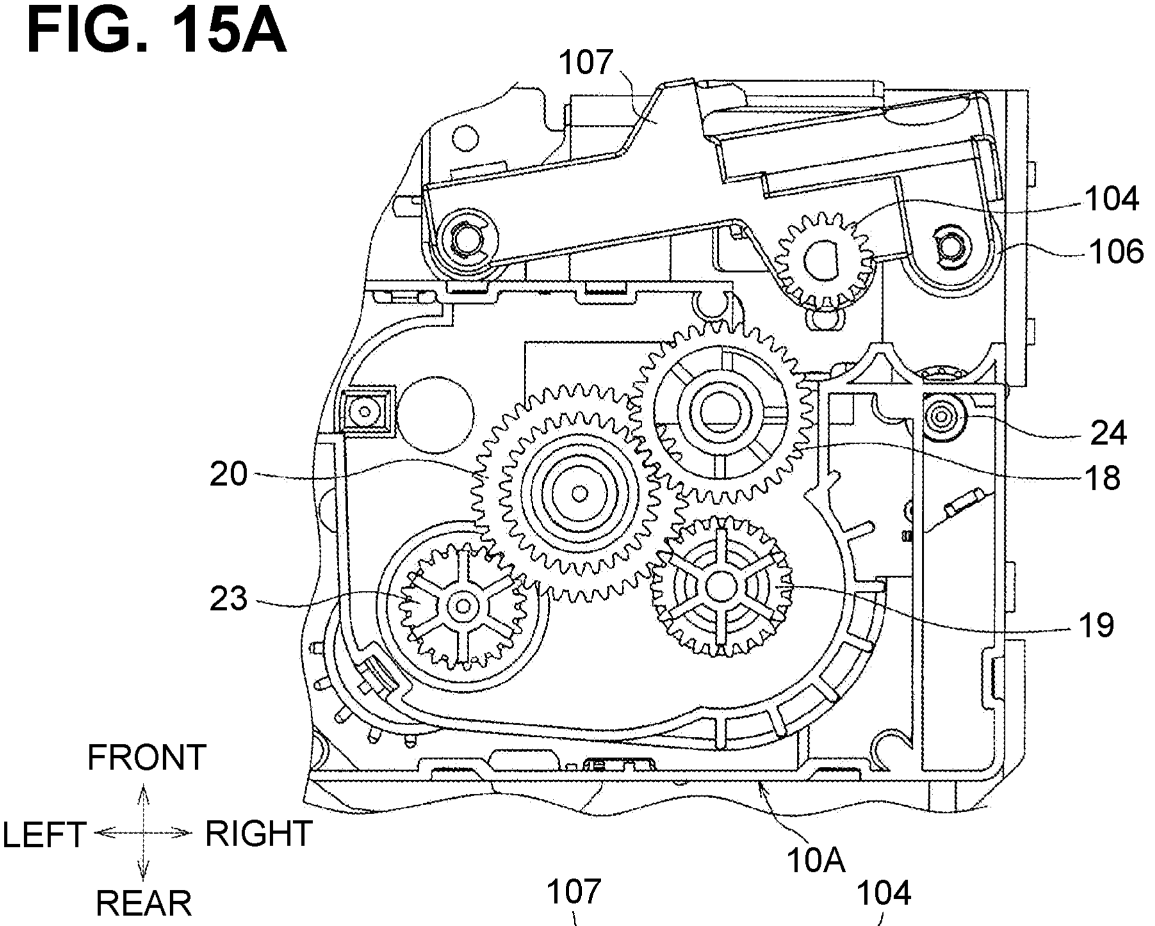
FIG. 15A is a schematic view illustrating a separated state in which an output gear and a platen gear are separated in the printing system of FIG. 11A.
Figure 15B:
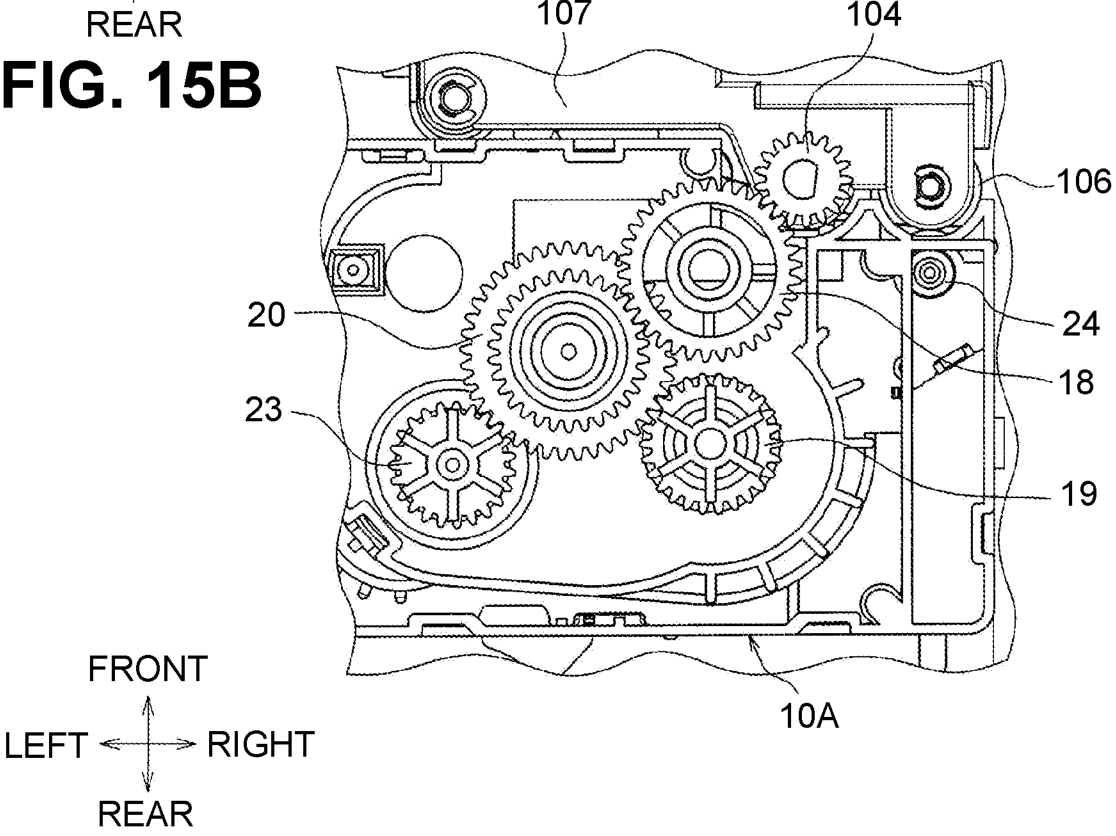
FIG. 15B is a schematic view illustrating an engaged state in which the output gear and the platen gear are engaged in the printing system of FIG. 11A.

As illustrated in FIG. 14, the pressing roller 106 is attached to the movable unit 107 and is configured to be swingable together with the platen roller 103 and the platen gear 104. That is, the pressing roller 106 are swingable between a position illustrated in FIG. 15A where the pressing roller 106 is spaced from the printing cassette 10A and a position illustrated in FIG. 15B where the pressing roller 106 presses the to-be-printed tape and the laminating tape in cooperation with the pinch roller 24.

2-2. Effects

According to the illustrative embodiment described in detail above, the following effects may be obtained.

(2a) While having the same advantages as those of the first illustrative embodiment, contents printed on the to-be-printed tape may be protected by the laminating tape.

3. Other Illustrative Embodiments

Although the illustrative embodiments of the disclosure have been described above, it is needless to say that the disclosure is not limited to the above-described illustrative embodiments and may adopt various embodiments.

(3a) The printers of the above-described illustrative embodiments are not limited to printers that perform printing using an ink ribbon. The printers may perform printing using a heat-sensitive sheet that is a continuous strip as a to-be-printed tape. In addition, a printing cassette might not necessarily include an ink ribbon roll and a second feed spool.

Figure 16:
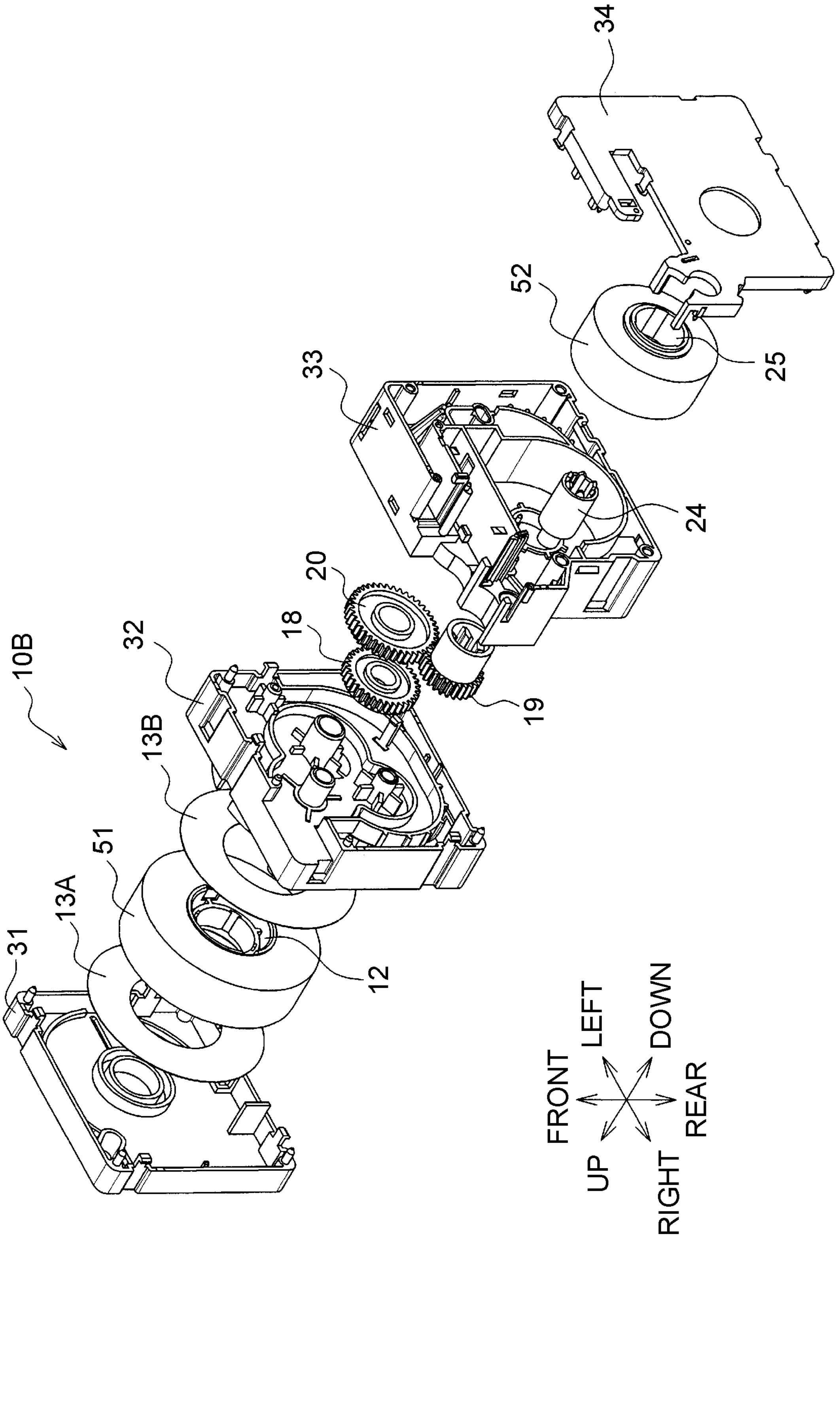
FIG. 16 is a disassembled schematic perspective view of a printing cassette for a printing system according to an illustrative embodiment different from the illustrative embodiments illustrated in FIGS. 1A and 11A.

For example, a printing cassette 10B illustrated in FIG. 16 is identical to the printing cassette 10 of the first illustrative embodiment including a to-be-printed tape roll 51 of a heat-sensitive sheet and a laminating tape roll 52 of a laminating tape as alternatives to the to-be-printed tape roll 11 and the ink ribbon roll 14, respectively.

In the printing cassette 10B, the laminating tape roll 52 is wound around the third feed spool 25 of the second illustrative embodiment. The printing cassette 10B includes the pinch roller 24 of the second illustrative embodiment, but does not include the second feed spool 15.

(3b) In the printing cassettes of the above-described illustrative embodiments, the output unit that transmits a driving force to the platen roller is not limited to a gear. For example, a roller or a spool may be used as the output unit. Further, the input unit to which a driving force from the driving source is input is not limited to a gear. For example, a roller or a spool may be used as the input unit.

(3c) In the printing cassette of the second illustrative embodiment, a laminating tape may be wound around the additional spool.

Figure 17:
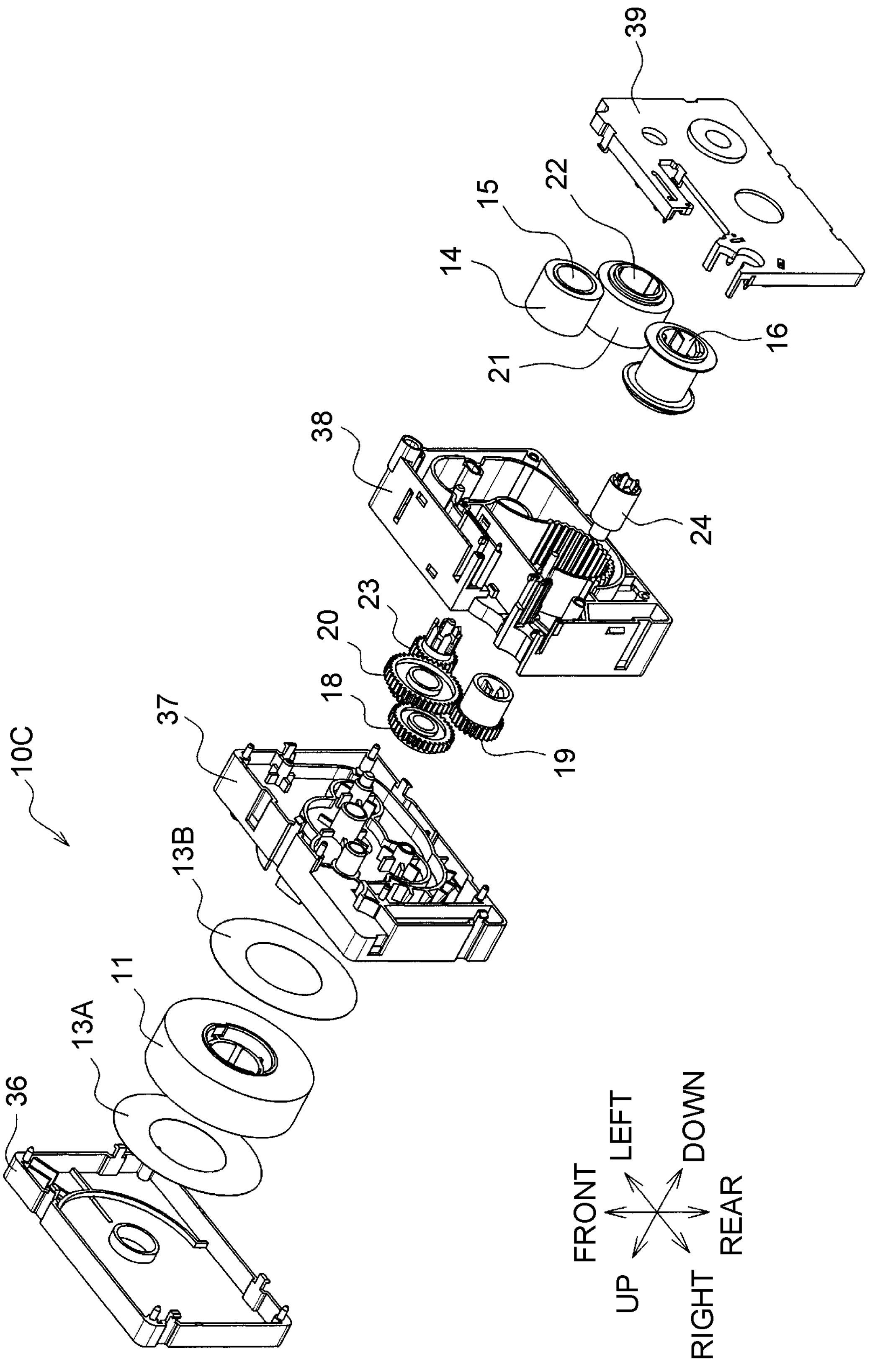
FIG. 17 is a disassembled schematic perspective view of a printing cassette for a printing system according to an illustrative embodiment different from the illustrative embodiments illustrated in FIGS. 1A, 11A, and 16.

For example, a printing cassette 10C illustrated in FIG. 17 is identical to the printing cassette 10A of the second illustrative embodiment in which a laminating tape roll 21 of a laminating tape is wound around the additional spool 22. The printing cassette 10C includes the input spool 16 of the first illustrative embodiment as an alternative to the third feed spool 25 of the second illustrative embodiment. The input spool 16 is used as a take-up spool for an ink ribbon.

(3d) The printing cassettes according to the above-described illustrative embodiments are not limited to a printing cassette in which a to-be-printed tape roll, an output gear, and an auxiliary tape roll (i.e., an ink ribbon roll or a laminating tape roll) for an auxiliary tape to be used for printing or protecting the to-be-printed tape are arranged in the up-down direction. In the printing cassette, the to-be-printed tape may be disposed overlapping the auxiliary tape roll in a direction perpendicular to the up-down direction.

Figure 18:
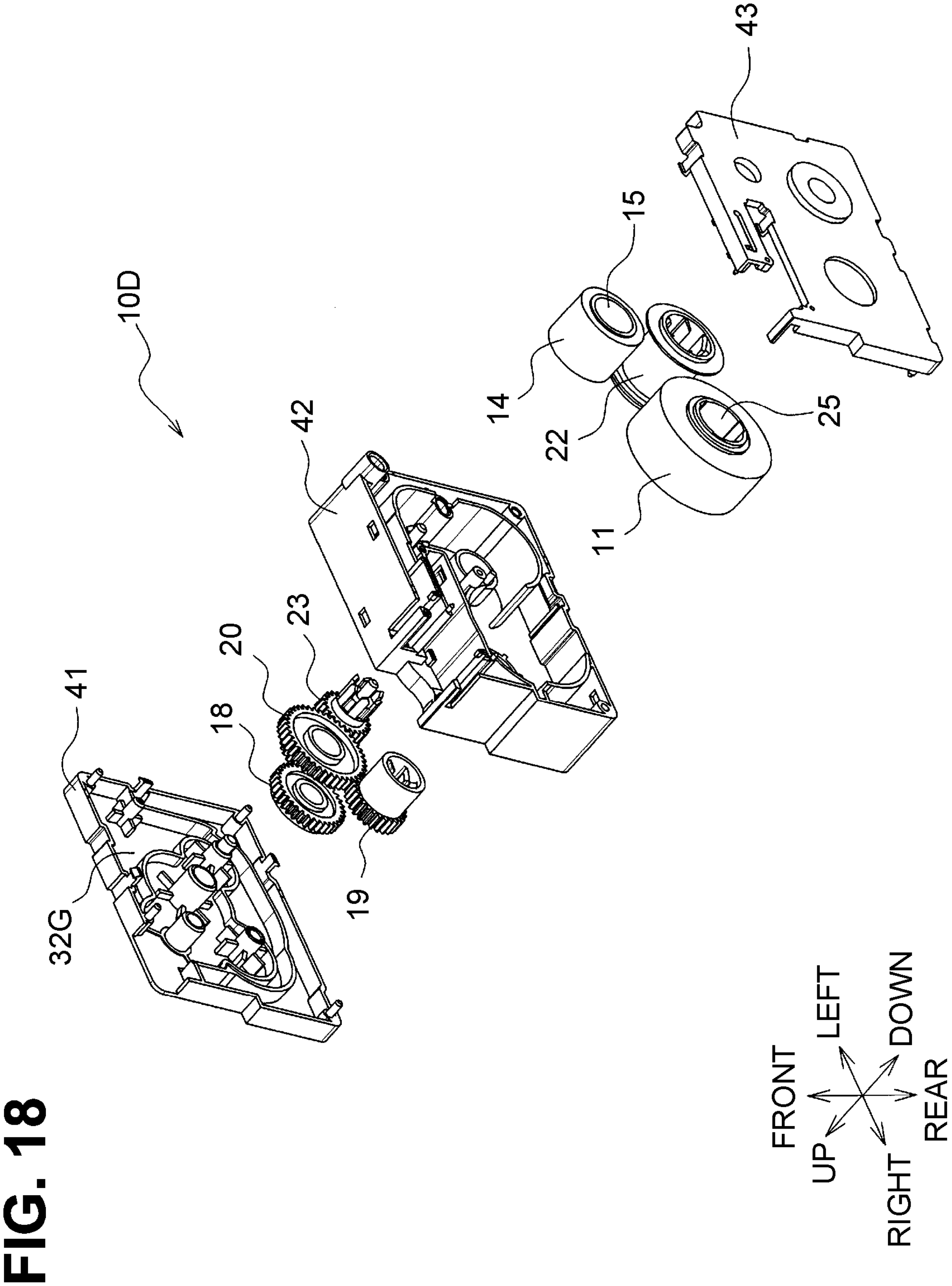
FIG. 18 is a disassembled schematic perspective view of a printing cassette for a printing system according to an illustrative embodiment different from the illustrative embodiments illustrated in FIGS. 1A, 11A, 16, and 17.

For example, a printing cassette 10D illustrated in FIG. 18 includes a first case portion 41, a second case portion 42, and a cover portion 43 as alternatives to the first cover portion 36, the first case portion 37, the second case portion 38, and the second cover portion 39 of the printing cassette 10A of the second illustrative embodiment.

The first case portion 41 is identical to the first case portion 37 of FIG. 12 whose dimension in the right-left direction is adjusted and from which the portion below the inner wall 32G is removed. The second case portion 42 is identical to the second case portion 38 of FIG. 12 whose dimension in the right-left direction is adjusted. The cover portion 43 is identical to the second cover portion 39 of FIG. 12 whose dimension in the right-left direction is adjusted.

The to-be-printed tape roll 11 is wound around a third feed spool 25 of the printing cassette 10D as an alternative to the laminating tape roll 21. The ink ribbon is taken up by the additional spool 22 as in the second illustrative embodiment.

Further, a heat-sensitive sheet may be used as the to-be-printed tape in the printing cassette 10D. In this case, the printing cassette 10D does not need to include the ink ribbon roll 14, the second feed spool 15, the additional spool 22, and the additional gear 23, and includes only the to-be-printed tape roll 11 as a roll.

(3e) The printing cassettes of the above-described illustrative embodiments may include two or more idle gears. That is, the printing cassettes may include a transmission gear train that engages with the input gear. Further, the input gear and the output gear may be directly engaged with each other but not via the idle gear.

(3f) The functions of a single component in the above-described illustrative embodiments may be achieved by multiple components, or the functions of respective multiple components may be achieved by a single component. Further, some of the configurations of the above-described illustrative embodiments may be omitted. In addition, at least some of the configurations of one or more of the above-described illustrative embodiments may be added to or replaced with the configurations of another embodiment. It should be noted that all aspects included in the technical idea specified by the wording described in the claims are embodiments of the disclosure.

What is claimed is:

1. A printing cassette comprising:
- a case;
- a to-be-printed tape, at least a portion of which is accommodated in the case;
- a first gear including a first internal gear and a first external gear, the first gear rotatable about a first axis extending in a first direction;
- a transmission gear or a transmission gear train engaging with the first external gear; and
- a second gear including a second external gear engaging with the transmission gear or the transmission gear train, the second gear being rotatable about a second axis extending in the first direction, wherein:
- an entirety of the first internal gear is accommodated in the case,
- a portion of the second external gear is located outside the case; and
- the case has an opening such that the portion of the second external gear is exposed in a second direction perpendicular to the first direction, through the opening.

2. The printing cassette according to claim 1, wherein an entirety of the first external gear is accommodated in the case.

3. The printing cassette according to claim 1, further comprising a rotating spool,
- wherein a rotation axis of the rotating spool is coaxial with a rotation axis of the first internal gear.

4. The printing cassette according to claim 3, wherein the rotating spool includes a second internal gear.

5. The printing cassette according to claim 1, further comprising:
- an ink ribbon; and
- a take-up spool,
- wherein the first gear is connected to be driven to the take-up spool.

6. The printing cassette according to claim 5, further comprising a clutch connecting the first gear to be driven to the take-up spool.

7. A printing cassette comprising:

a case;

a to-be-printed tape, at least a portion of which is accommodated in the case;

a first gear including a first internal gear and a first external gear;

a transmission gear or a transmission gear train engaging with the first external gear; and a second gear including a second external gear engaging with the transmission gear or the transmission gear train, wherein:

an entirety of the first internal gear is accommodated in the case, a portion of the second external gear is located outside the case; and the case has an opening, and the portion of the second external gear extends through the opening.

* * * * *